United States Patent
Pohlman, Jr. et al.

(10) Patent No.: US 7,096,967 B2
(45) Date of Patent: Aug. 29, 2006

(54) ROBOTIC SOD STACKER WITH SOFTWARE CONTROL

(75) Inventors: Frank R. Pohlman, Jr., Fort Atkinson, WI (US); Hubert Fixen, Willmar, MN (US)

(73) Assignee: Steiner Turf Equipment, Inc., Providence, RI (US)

( * ) Notice: Subject to any disclaimer, the term of this patent is extended or adjusted under 35 U.S.C. 154(b) by 0 days.

(21) Appl. No.: 10/898,710

(22) Filed: Jul. 23, 2004

(65) Prior Publication Data

US 2005/0167123 A1    Aug. 4, 2005

Related U.S. Application Data

(63) Continuation-in-part of application No. 10/624,462, filed on Jul. 22, 2003, which is a continuation-in-part of application No. 10/619,537, filed on Jul. 15, 2003.

(60) Provisional application No. 60/395,832, filed on Jul. 15, 2002.

(51) Int. Cl.
A01B 45/04        (2006.01)

(52) U.S. Cl. .................................. 172/20; 414/911

(58) Field of Classification Search ............ 172/1, 172/19, 20, 36; 414/540, 911, 792.4, 791.6; 193/3; 56/10.2 R
See application file for complete search history.

(56) References Cited

U.S. PATENT DOCUMENTS

| | | |
|---|---|---|
| 2,617,347 A | 11/1952 | Provost |
| 3,509,944 A | 5/1970 | Brouwer et al. |
| 3,519,082 A | 7/1970 | Miner |
| 3,590,927 A | 7/1971 | Brouwer et al. |
| 3,653,448 A | 4/1972 | Morrill |
| 3,664,432 A | 5/1972 | Nunes, Jr. |
| 3,672,452 A | 6/1972 | Miner |
| 3,698,534 A | 10/1972 | Hadfield |
| 3,877,584 A | 4/1975 | Holcombe |
| 3,887,013 A | 6/1975 | Helberg |
| 3,935,904 A | 2/1976 | Beck |
| 4,063,384 A | 12/1977 | Warren et al. |
| 4,067,393 A | 1/1978 | Szarkowski |
| 4,142,691 A | 3/1979 | Watton |
| 4,162,726 A | 7/1979 | Hudson et al. |
| 4,294,316 A | 10/1981 | Hedley et al. |
| 4,345,659 A | 8/1982 | Arnold |
| 4,408,666 A | 10/1983 | Lawson |
| 4,777,890 A | 10/1988 | Raymond |
| 4,828,040 A | 5/1989 | Schumacher |
| 4,832,130 A | 5/1989 | Brouwer et al. |
| 4,966,239 A | 10/1990 | Hutchison |
| 5,165,617 A | 11/1992 | Van Vuuren |
| 5,165,843 A | 11/1992 | Hendriks et al. |
| 5,217,078 A | 6/1993 | Zinn |

(Continued)

FOREIGN PATENT DOCUMENTS

EP        1116429 A1    7/2001

*Primary Examiner*—Victor Batson
(74) *Attorney, Agent, or Firm*—Harness, Dickey & Pierce, P.L.C.

(57) ABSTRACT

A numerically-controlled robotic manipulator arm mounted to a sod harvester comprises two segments pivotally coupled together. One segment is rotatably coupled to a fixed base on the harvester while the second segment carries a pick-up head which can turn with respect to the segment. The pick-up head is capable of picking up, holding, and releasing sod rolls. The arm is programmable so that a variety of configurations of stacked sod rolls can be achieved.

21 Claims, 29 Drawing Sheets

U.S. PATENT DOCUMENTS

| | | |
|---|---|---|
| 5,230,602 A | 7/1993 | Schouten |
| 5,269,379 A | 12/1993 | Millar et al. |
| 5,626,195 A | 5/1997 | Dover |
| 5,697,760 A | 12/1997 | Rosen |
| 5,775,436 A | 7/1998 | Noyes, II et al. |
| 5,878,498 A | 3/1999 | Mundt |
| 5,906,091 A | 5/1999 | Gemar |
| 5,950,407 A | 9/1999 | Rosen |
| 6,056,064 A * | 5/2000 | deVries ................. 172/20 |
| 6,056,065 A | 5/2000 | Campbell et al. |
| 6,223,830 B1 | 5/2001 | deVries |
| 6,237,427 B1 | 5/2001 | Helfrich et al. |
| 6,244,354 B1 * | 6/2001 | Van Vuuren ............. 172/19 |
| 6,273,196 B1 | 8/2001 | Van Vuuren |
| 6,296,063 B1 | 10/2001 | Tvetene et al. |
| 6,305,162 B1 | 10/2001 | Cobo et al. |
| 6,343,986 B1 | 2/2002 | Hofer |
| 6,364,027 B1 | 4/2002 | Tvetene et al. |
| 6,527,502 B1 | 3/2003 | Leijenaar |
| 6,659,189 B1 | 12/2003 | Woerner et al. |
| 6,681,864 B1 | 1/2004 | Tvetene et al. |
| 6,769,495 B1 * | 8/2004 | Van Loen ................. 172/19 |
| 6,779,610 B1 | 8/2004 | Brouwer et al. |
| 6,783,318 B1 | 8/2004 | Tvetene et al. |
| 2002/0043375 A1 | 4/2002 | Tvetene et al. |
| 2004/0037683 A1 | 2/2004 | Tvetene et al. |

* cited by examiner

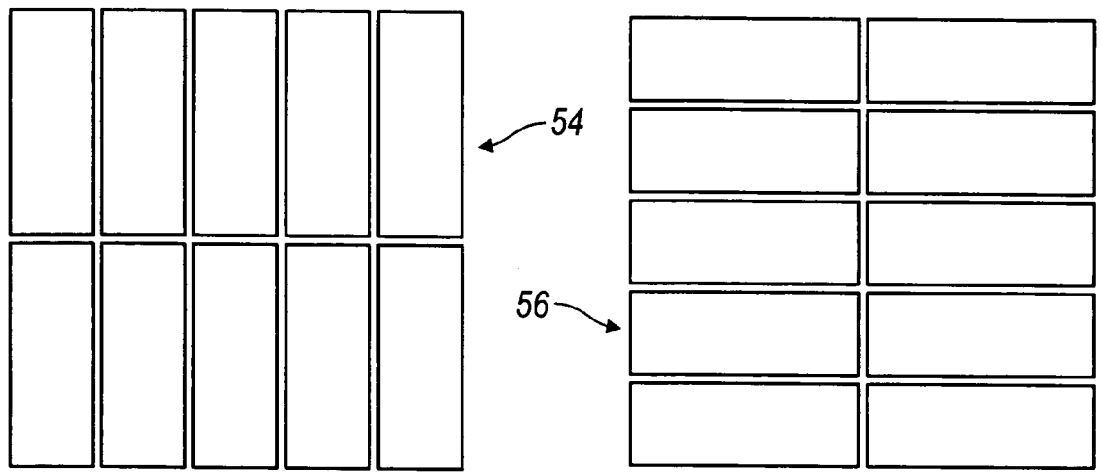
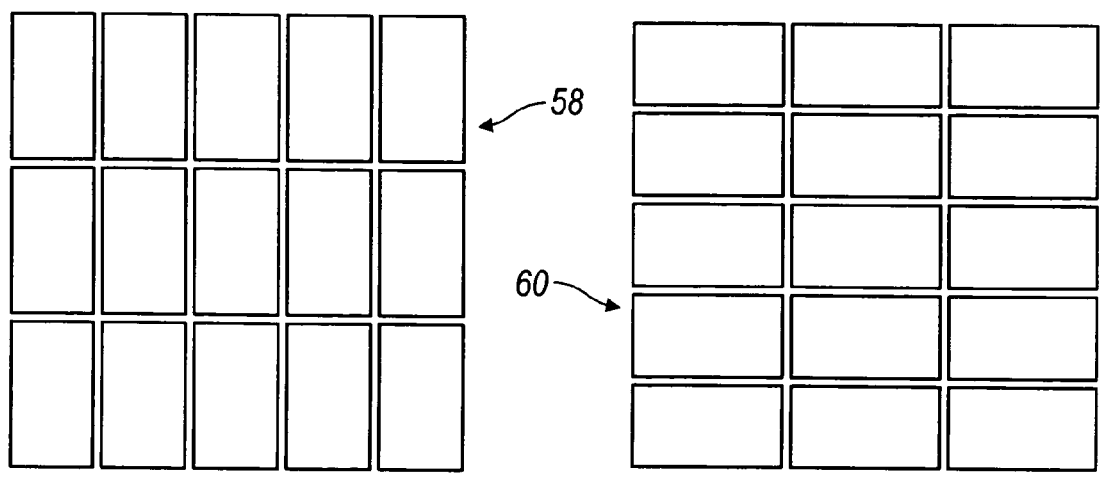
FIG. 2

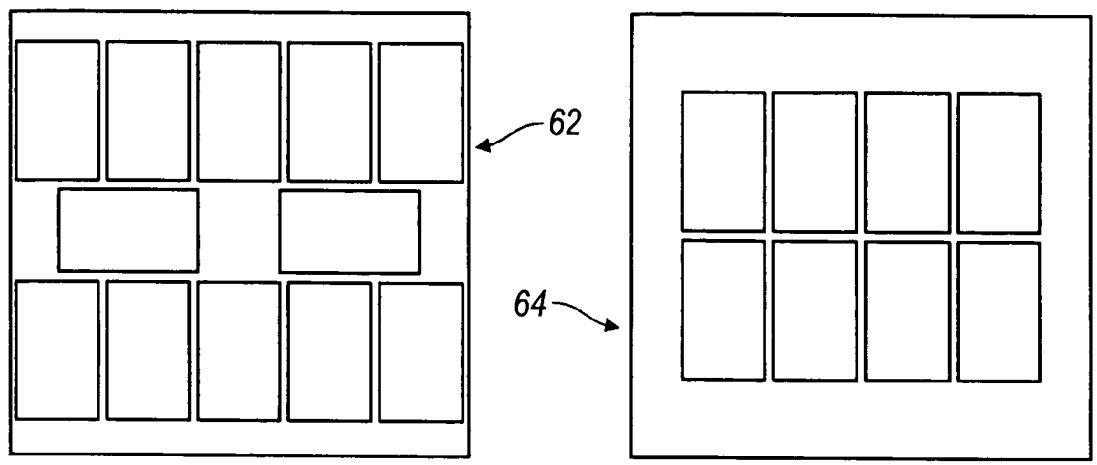
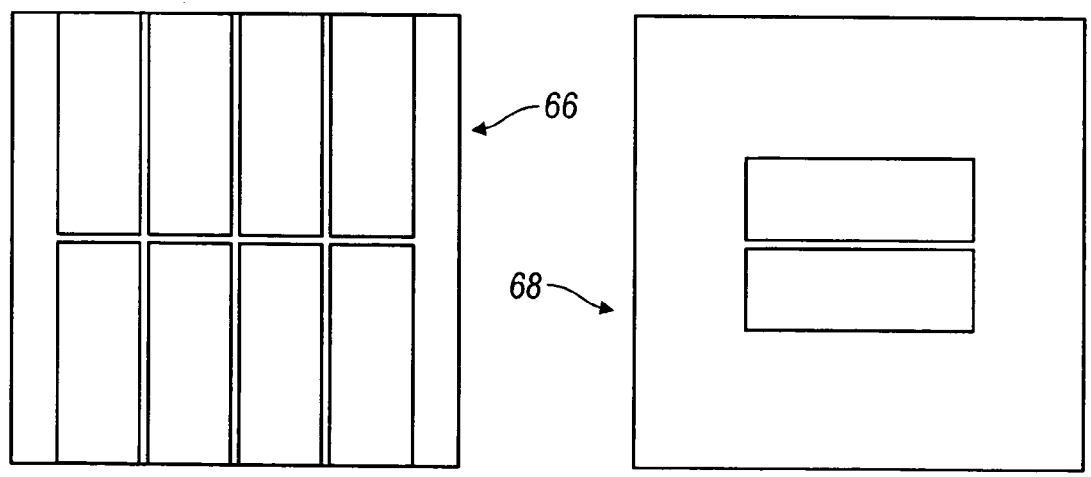
FIG. 3

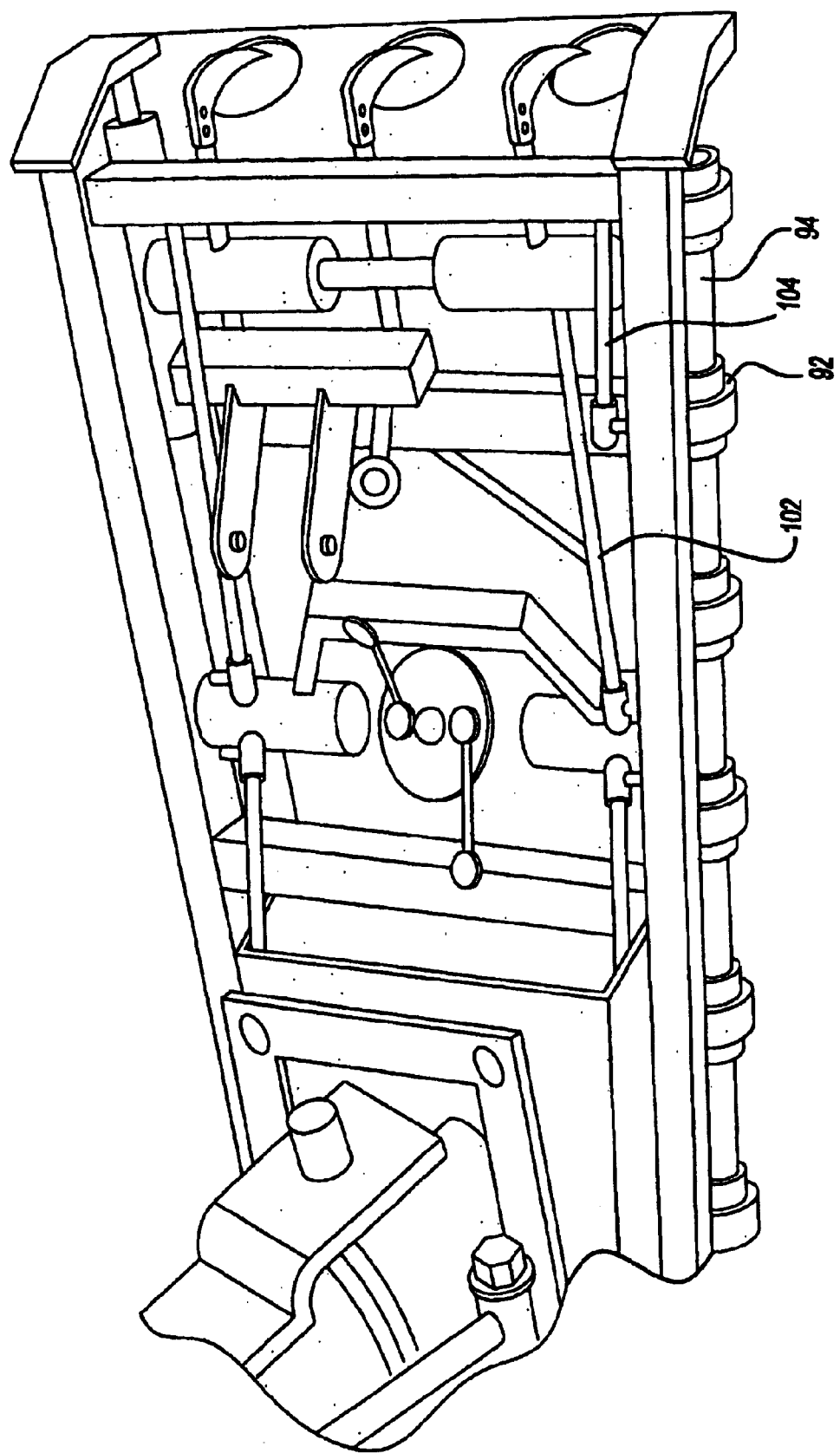

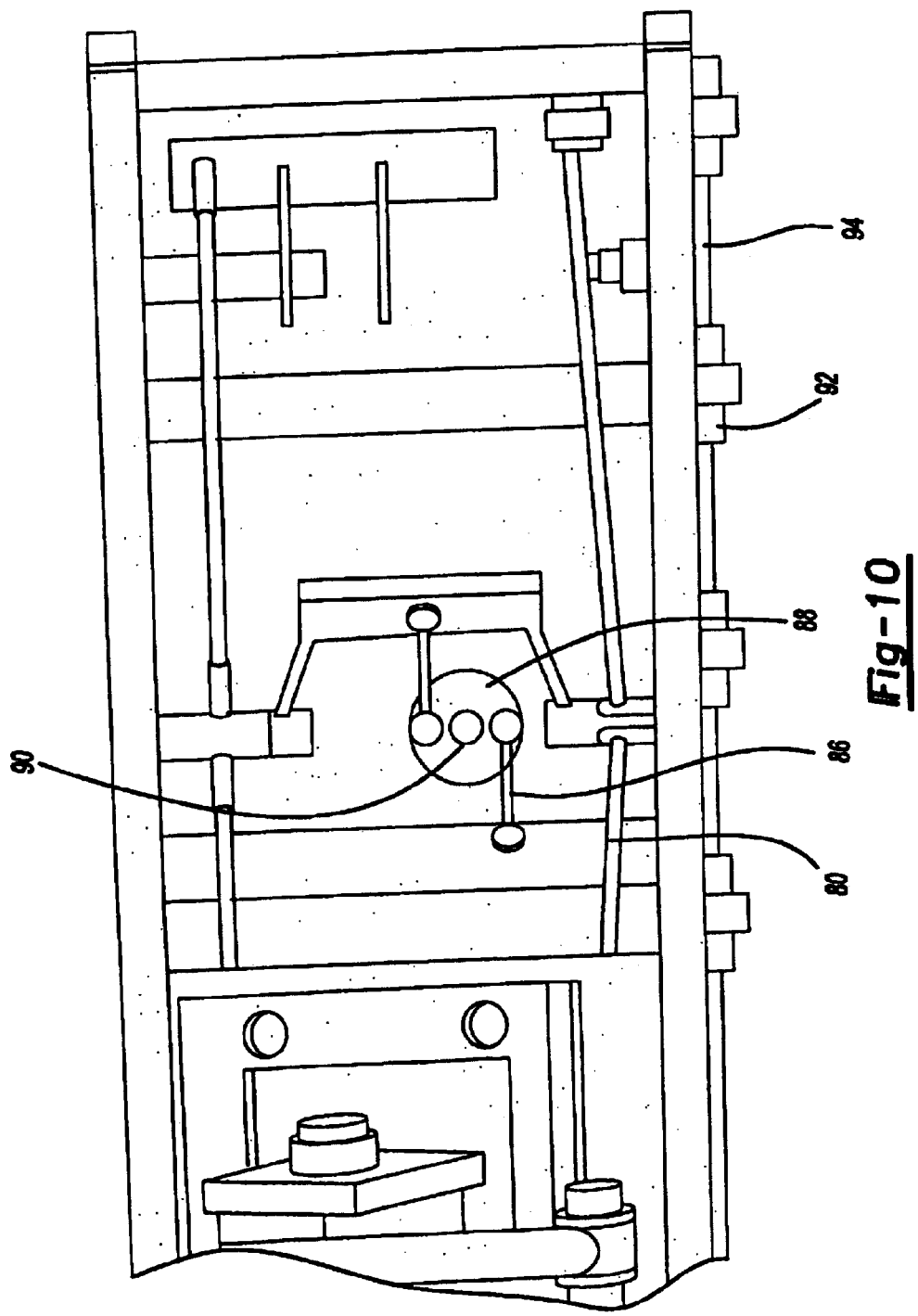

80 ROLLS PER PALLET

1ST LAYER        15 ROLLS

2ND LAYER        15 ROLLS

3RD LAYER        15 ROLLS

4TH LAYER        12 ROLLS

5TH LAYER         8 ROLLS

80 ROLLS

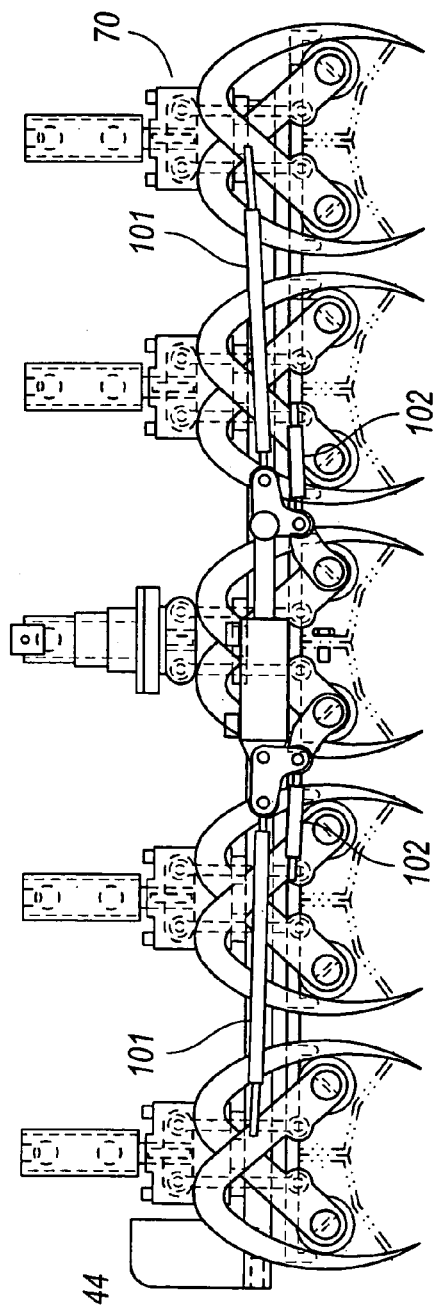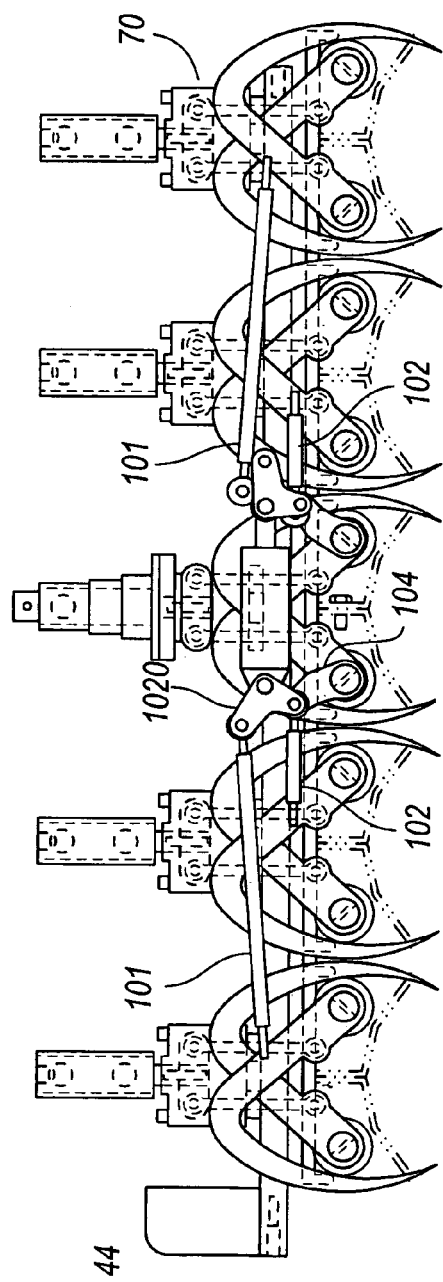

SOD ROLL FLAP ADJUST MUST BE DISPLAYED AT ALL TIMES IN WORK SCREEN

SOD ROLL FLAP ADJUST

ROBOTIC SOD STACKER WITH SOFTWARE CONTROL

CROSS REFERENCE TO RELATED APPLICATIONS

This application is a continuation-in-part Application of U.S. patent application Ser. No. 10/624,462, entitled Robotic Sod Stacker, filed on Jul. 22, 2003. U.S. patent application Ser. No. 10/624,462 is a continuation-in-part Application of Ser. No. 10/619,537, filed Jul. 15, 2003, which claims the benefit of U.S. Provisional Application No. 60/395,832, filed on Jul. 15, 2002. The disclosure of the above applications is incorporated herein by reference.

FIELD OF THE INVENTION

The present invention relates to sod harvesters and, more particularly, to a machine for cutting strips of sod from the ground and automatically forming a stack of rolled strips of sod.

BACKGROUND OF THE INVENTION

A sod harvester usually has a horizontal blade that severs the sod from the ground at the desired thickness in combination with two vertical side blades, which cut the sod to the desired width. Thus, a continuous strip of sod is formed as the harvester travels along its cutting path. A transverse vertical cutter blade is periodically driven into the sod adjacent the undercutting blade to cut the strip to length.

As the strip of sod is cut, it is conveyed away from the cutter blade, usually up an inclined conveyor, for forming into rolls. U.S. Pat. No. 3,509,944 (Brouwer et al.) discloses a prior art sod harvester which includes such an inclined conveyor, and in which the rolls of sod are formed adjacent the upper end of the conveyor. The sod harvester disclosed in the '944 patent is designed to be mounted at the side of a power unit, by which the harvester is propelled.

U.S. Pat. No. 4,832,130 (Brouwer et al.) discloses a self-propelled sod harvester. The harvester includes an inclined conveyor which delivers the strip of sod into a separate roll-forming enclosure which includes a pair of conveyors disposed generally at right angles to one another for forming the roll. The formed rolls are discharged onto a cart at the end of the harvester which can convey the formed roll to either side of the cart and clear of the harvester on its next pass. The '130 patent also discloses a curved conveyor for discharging formed rolls clear of the harvester.

Robots have long been used in industry to replace human operators doing repetitive manual operations. They have the advantages of consistency, accuracy, speed, and tirelessness. Automated processes or automatic machines share these advantages, but robots have the additional advantage of flexibility. In other words, automatic machines are capable of doing a single repetitive operation, while robots can be programmed to do a variety of operations. Robots derive this advantage from two things. First, the method of control is programmable, usually with a computer. Second, the mechanical manipulator is capable of a wide variety of motions.

Most commonly, robots have a fixed base. They do their work always at the same location. Examples include welding, painting, moving workpieces or tooling, and palletizing material. There also exist mobile robots, capable of moving from place to place. Examples of mobile robots include vehicles for moving material within a factory, or picking and moving goods within a warehouse. Generally, the flexible, programmable function of these robots include the carrying or moving of an object from one place to another.

There also exist automatic machines that gather and stack agricultural products. Examples include automatic bale wagons for gathering and stacking rectangular bales of hay, and automatic machines for loading and stacking cartons in an agricultural field. However, these prior machines lack the programmability and flexible manipulators of a robot.

At least for the last twenty years there has been an awareness of a need for automatic stacking of sod at the point of collection, or harvesting. Throughout that time, industrial robots were well-known to be in existence. Also, throughout that time there has been an awareness that sod growers in different regions use different sizes of sod rolls and different configurations of stacks of sod rolls. Even so, during that time the only machines developed for that purpose have been automatic stackers, relatively large, not programmable, and dedicated to a single size or method of stacking. In addition, it has been common practice to stack sod manually in a way that the top layers of the stack are smaller than lower layers, in order to enhance the stability of the stack. No mechanical stacker has provided a way to accomplish this method of stacking.

SUMMARY OF THE INVENTION

This present invention intends to provide a mobile robot for accumulating sod on a stack at the point of collection. One object of the invention is to provide a single machine that is capable of stacking various sizes of sod rolls, for example, 16" and 24" wide, in various stacking configurations based on local market preferences. A further object is to provide a mechanical sod stacker that is capable of depositing layers on the top of the stack that are smaller than the lower layers, resulting in a more stable stack. A further object is to provide a mechanical sod stacker that is significantly smaller and mechanically simpler than automatic stackers previously developed.

According to one embodiment of the invention, a pair of mechanisms are mounted to the rear of a conventional small roll sod harvester, or other machine that cuts and rolls turf-grass sod. The first mechanism is an accumulator that gathers sub-groups of sod rolls. The second mechanism is an articulated arm with a pick-up head, controlled by a programmable computer, that picks up the sub-groups of sod and places them on a stack in predetermined but flexible pattern. Designs for the accumulator and articulated arm with pick-up head, all of which overcome the problems of the prior art are disclosed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

In order that the invention may be more clearly understood, reference will now be made to the accompanying drawings which illustrate preferred embodiments of the invention by way of example, and in which:

FIGS. 2 and 3 are schematic plan views illustrating various configurations in which sod rolls may be placed using a sod stacker in accordance with the invention;

FIG. 8 shows actuating cylinders not shown in FIG. 7;

FIGS. 9 and 10 are reproductions of photographs of an actual gripper head as seen from above;

FIGS. 19*a* and 19*b* represent an alternate linkages for the pick-up head;

DETAILED DESCRIPTION OF THE PREFERRED EMBODIMENTS

The following description of the preferred embodiments are merely exemplary in nature and is in no way intended to limit the invention, its application, or uses.

Figure 1A:
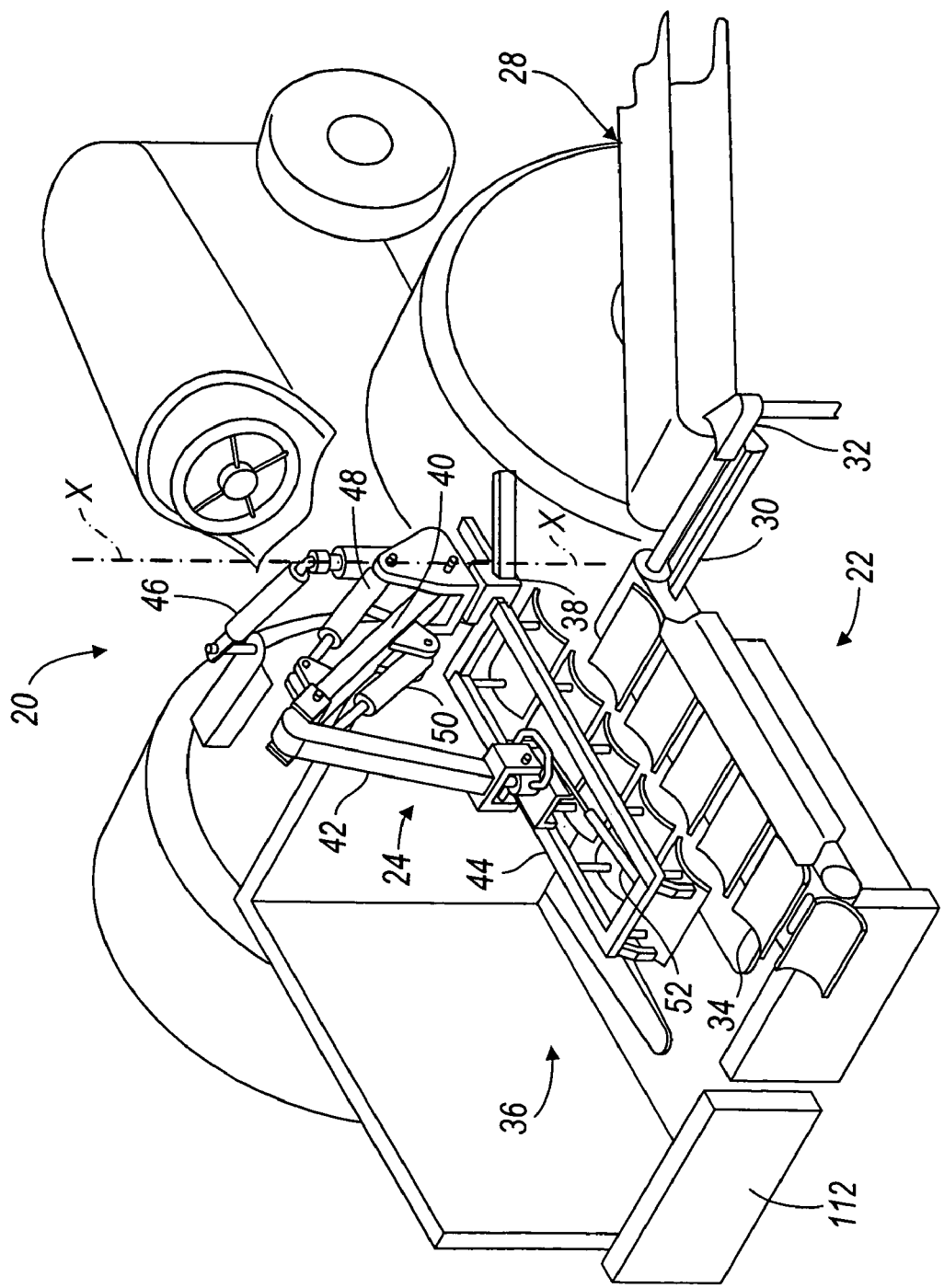
FIGS. 1a and 1b are perspective views of the sod harvester in accordance with one embodiment of the invention.
Figure 1B:
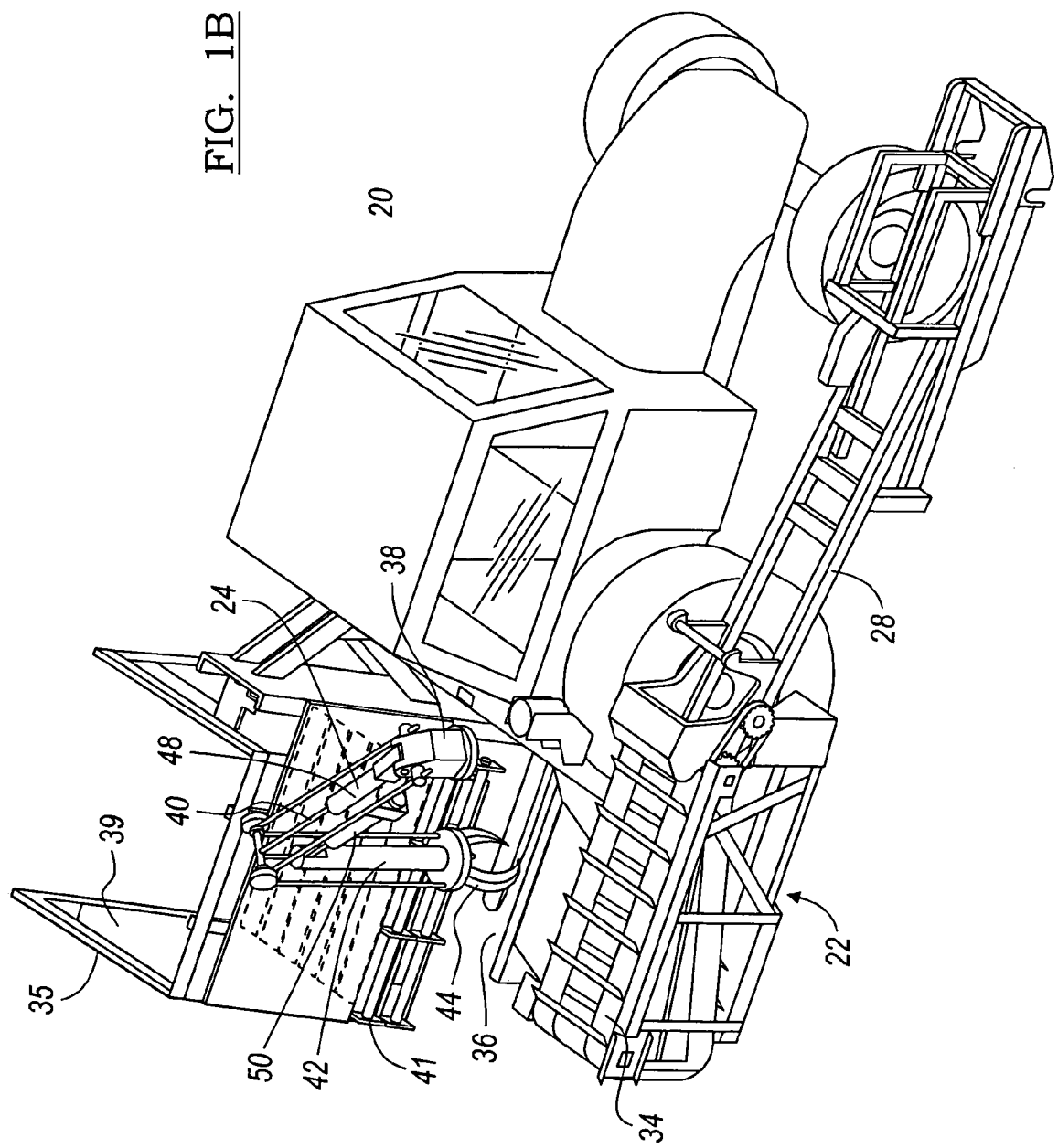
Figure 16:
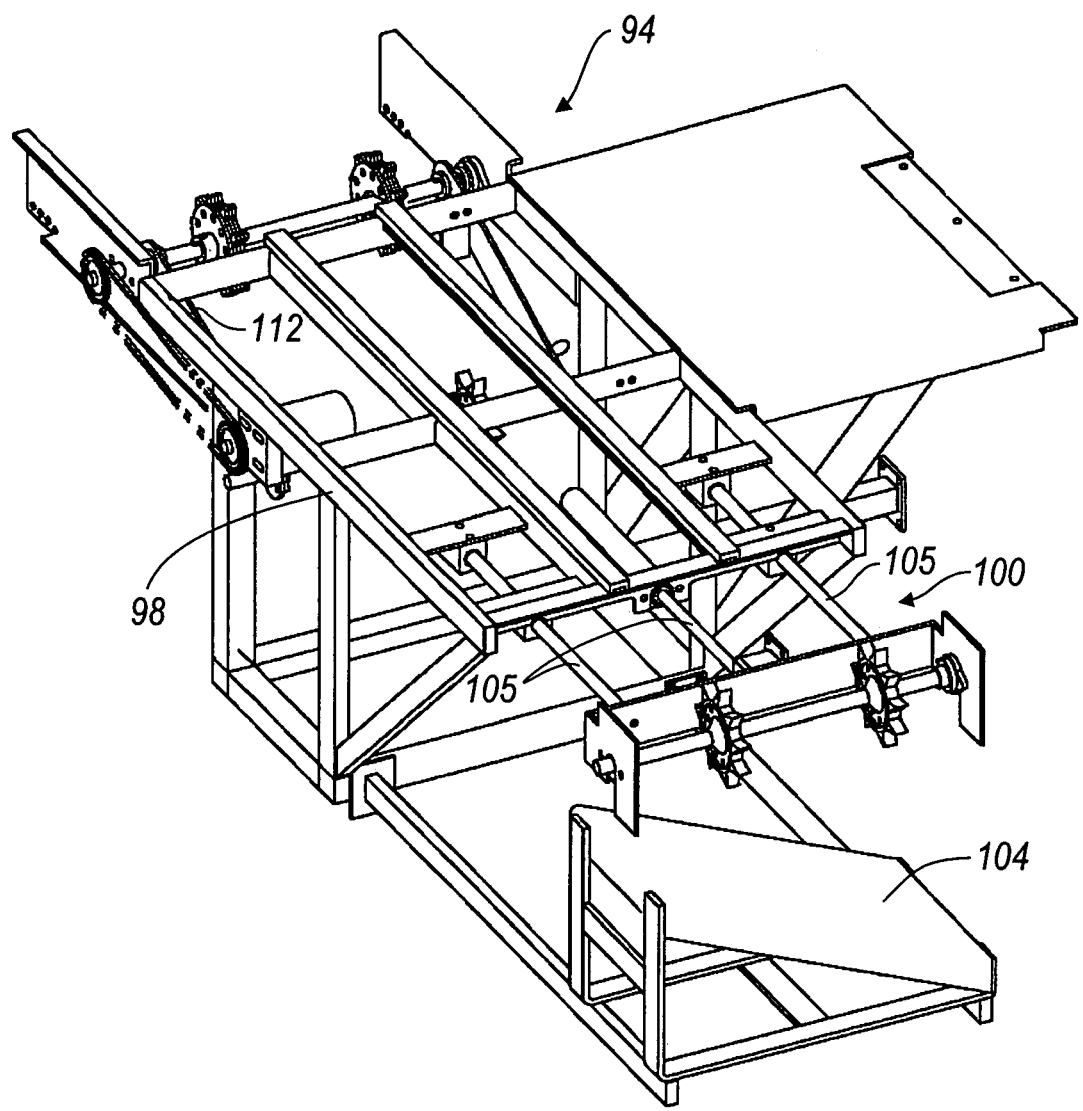
FIGS. 16 and 17 are a perspective view of an alternate accumulator according to the teachings of the present invention.

FIGS. 1*a* and 1*b* are views of a small roll sod harvester 20 fitted with an accumulator device 22 and a robot in the form of an articulated arm 24 with pick-up head. In the context of the invention, a robot is defined as being a digitally controlled arm. Colloquially, a machine may be called a robot even if a human operator is controlling portions of the operations remotely. Optionally, as described below, the sod harvester can be equipped with an automatic pallet dispenser, which automatically positions pallets into the proper location for loading by the machine. As shown in FIG. 16, the sod stacker can have an optional pallet presenter 35. The pallet presenter 35 has an empty pallet magazine 39 and a mechanism 41 for positioning an empty pallet into a loading location.

Reference numeral 28 designates a conveyor which delivers rolled sod to the rear of the sod harvester. The rolled sods are deposited from conveyor 28 onto a tray 30. A sensor detects the presence of the roll, which prompts the controller to cause a pusher 32 to move laterally from right to left, moving the roll of sod onto an indexable accumulator conveyor 34. Accumulator conveyor 34, which is made of rubber having indexing lugs, advances every time a sod roll is moved onto it, until a sub-group of sod rolls is accumulated. At this time, a computer (not shown) controls the articulated arm 24 with pick-up head to pick up the sub-group of sod rolls and place them into a piling cavity 36. In this regard, the piling cavity 36 has a pair of actuate forks, which support a sod supporting pallet, or a palletless sod stack 37. Optionally, the accumulator conveyor can contain a plurality of retention baskets coupled to the conveyor between the indexing lugs. The retention baskets can have a rectangular or curved cross section.

Tray 30 and pusher 32 function to bring the rolled sod to the accumulator conveyor 34. The tray 30 and pusher 32, however, are not essential to the invention. They are used to transfer the sod rolls to a position closer to the piling cavity 36 so that the articulating arm does not have to move as far to pick them up, which increases productivity. A co-liner positioning of the conveyor 28 with the accumulator conveyor 34 obviates the need for the tray 30 and pusher 32.

Figure 15:
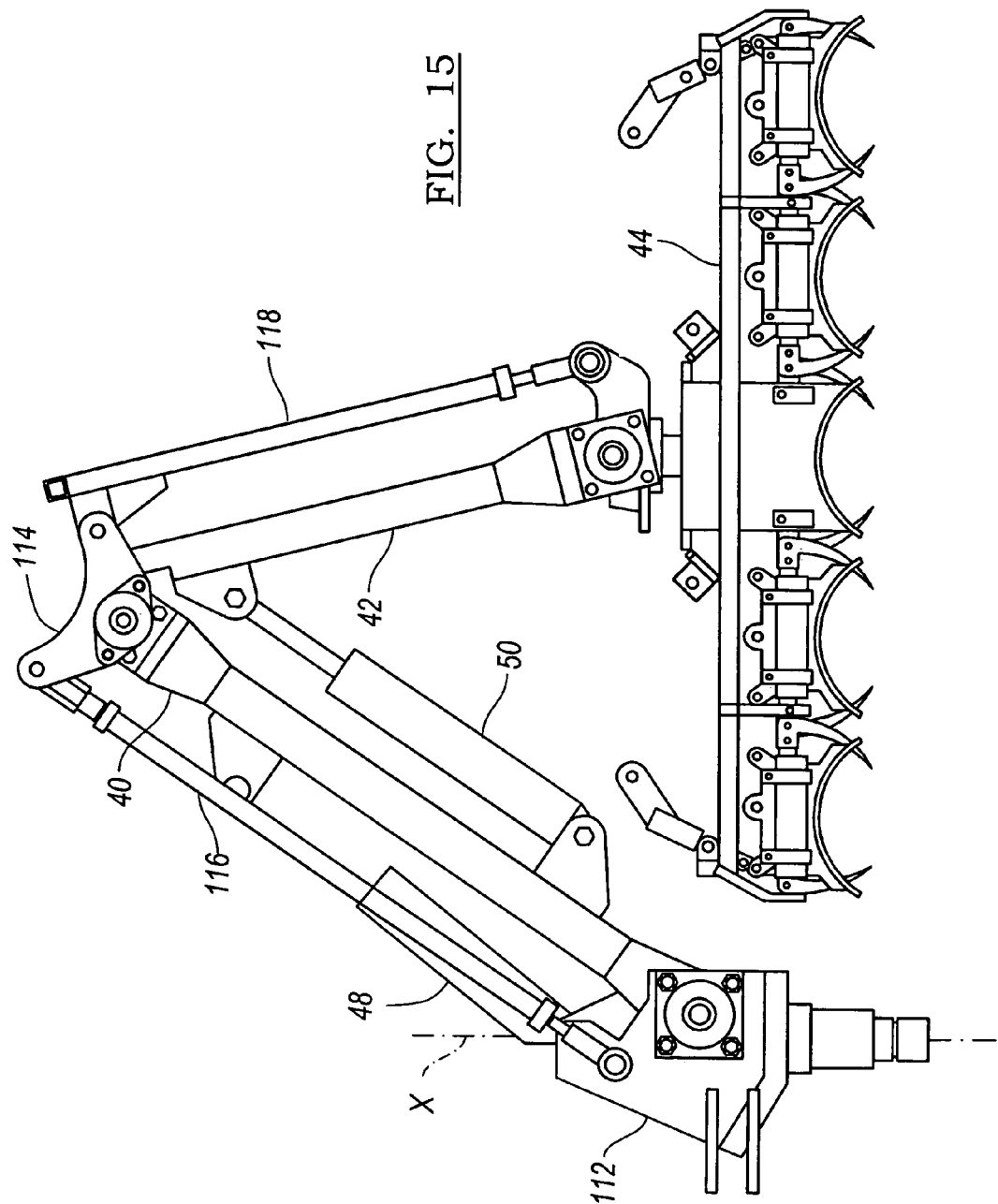
FIG. 15 is a view showing self-leveling linkages for the pick-up head.

Referring briefly to FIG. 15, the articulated arm 24 is mounted on a base 38 for turning about a vertical axis X—X. One end of a first arm segment 40 is pivotally mounted to base 38 for turning about vertical axis X—X, and one end of a second arm segment 42 is pivotally mounted to the other end of segment 40 about a horizontal axis. A pick-up head 44 is mounted to the other end of segment 42 to turn about a vertical axis. Hydraulic cylinders drive all four of these pivoting actions. Electronic feedback from encoders related to the cylinders tells the computer the exact location of each cylinder. The computer controls both the position and the speed of each cylinder. The computer can be programmed in a way to optimize the travel time of the pick-up head for maximum productivity.

Further, the location of the arm is optionally controlled by the computer using pressure transducer information from the gripping forks. The pressure transducer is used to sense when the rolls are starting to land on the forks or on the previous row. This feature allows the robot to compensate the position of the rolls of varying diameter, which results in layers of different thickness. By sensing a reduction in pressure when the sod starts to land on the stack reduces cycle time.

Reference numeral 46 indicates the hydraulic cylinder that swings the whole articulated arm assembly 24 about the pivot axis X—X on arm base 38. Numeral 48 denoted the cylinder that raises and lowers arm segment 40. Numeral 50 denotes the cylinder that extends and retracts arm segment 42. Numeral 52 denotes the cylinder that pivots the pick-up head 44. Head 44 is also pivotally coupled to arm segment 42 about a horizontal axis, but is held level by self-leveling linkages.

Critical to the correct functioning of the pick-up head 44 is that the pick-up head 44 must be horizontal at all times. This is accomplished by means of two self-leveling linkages, reference numerals 116 and 118 in FIG. 15. Self-leveling linkage 116 is pivotally connected at the bottom to the pivoting base 112 of the articulating arm. At the top, it is pivotally connected to linkage 114. The length of self-leveling linkage 116 is the same as the length of arm 40, and the orientation of the end pivot point to the pivots of arm 40 are the same. This 4-bar linkage serves to keep link 114 at a consistent angle to horizontal. Likewise, self-leveling linkage 118 is constructed as one member of a 4-bar linkage including arm segment 42, and served to keep the pick-up head 44 horizontal at all times. Without the self-leveling links, an additional cylinder and control would be needed to keep the head level as arm segment 42 moves about its upper pivot point.

The self leveling linkage 116 is coupled to the first arm structure which is formed of two generally parallel members. Each member is coupled to the base 112 at a respective proximal end. Each member is also rotatably coupled to a first linkage 114 at a respective member distal end of each member. This construction forms the 4-bar linkage configuration which functions to maintain the angular orientation of the first linkage 114.

Coupled to the first linkage 114 is a second arm structure which is additionally formed of a pair of generally parallel members 42, 118. Each of the members is rotatably coupled at one end to the first linkage and at a second end to a second linkage. A first actuator 48 is disposed between the base 112 and the first member 40 while a second actuator 50 is disposed between the first member 40 and the third member 42. The controller is coupled to these actuators 48, 50 to control the operation of the arm structure.

FIGS. 2 and 3 show a sample of the variety of stacking configurations that is possible using a robotic stacker. Assuming the base of the stack is 48" by 48", reference numerals 54, 56, 58 and 60 denote layer configurations that fill the base dimensions. Reference numerals 54 and 56 indicate rolls of sod that are 24 inches wide, so the layers consist of two rows of rolls. Reference numerals 58 and 60 show rolls of sod that are 16 inches wide, so the layers consist of three rows of 5 rolls. Orienting the layers alternately rotated 90 degrees to one another contributes to the stability of the stack. As the stack grows higher, stability is enhanced by making the top layers successively smaller than the lower layers. With a programmable robot, this can be accomplished in several ways.

For example, considering the configuration indicated by reference numeral 60, two sixteen inch rolls in subgroups of five are placed closer together, leaving room for two additional rolls to be placed between those subgroups. The two additional rolls are dropped from the next two subgroups of 5, leaving two rows of four for the top layer (ref. 64—FIG. 3).

Reference numeral 66 indicates a smaller layer of 24 inch wide rolls, consisting of 2 subgroups of 4 rolls each. This is accomplished by picking up the sub-group earlier, after the fourth roll is deposited on the accumulator conveyor. Reference numeral 68 shows the top layer, consisting of one subgroup of 2 rolls. It can be seen that the ability to pick up varying numbers of rolls, to drop one of the subgroup independently, and to locate the layers in various positions, gives rise to a wide variety of stacking methods.

The hydraulic cylinders that drive the pivoting actions of the articulated arm and pick-up head are controlled using a commercially available programmable controller (computer) with commercially available proportional hydraulic valves.

The difficulty is that the controller is designed to work with servo motors, or servo valves, which are much more expensive than proportional valves. The lack of compatibility is due to the different response times. Servo motors and servo valves have a very fast response time relative to proportional valves. In other words, when the controller sends a signal to a servo motor, it responds almost instantaneously. When the same controller sends a signal to a proportional valve, there is some delay in the response. A feature of the present invention is the specification for an amplifier between the controller and the proportional valve, which includes a way to get instantaneous response from the proportional valve.

Figure 5:
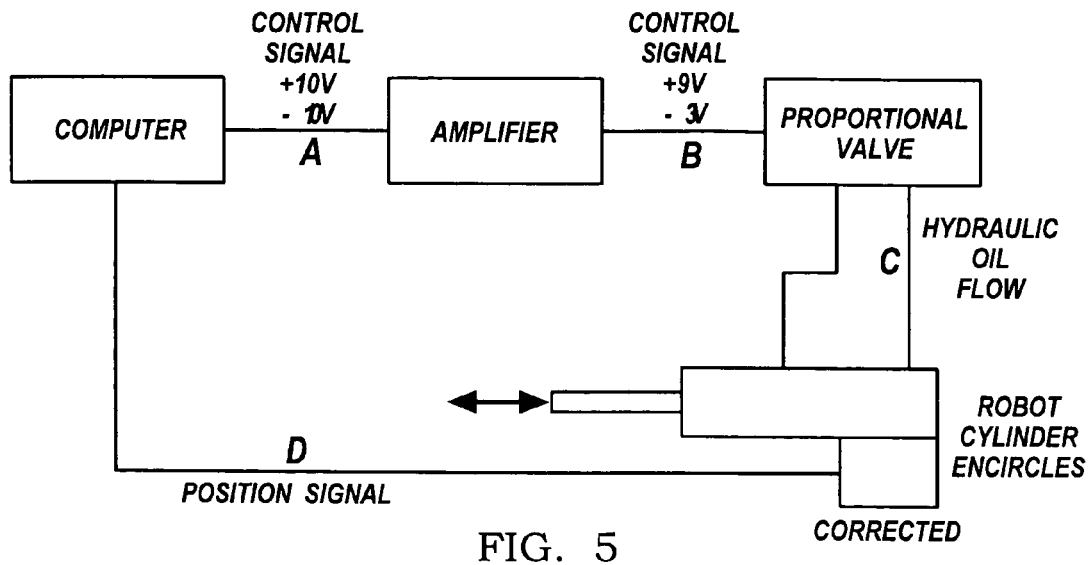
FIGS. 4 and 5 are, respectively, a series of graphs and a schematic circuit diagram illustrating the operation of a hydraulic cylinder via a proportional valve in accordance with a feature of the invention.
Figure 4:
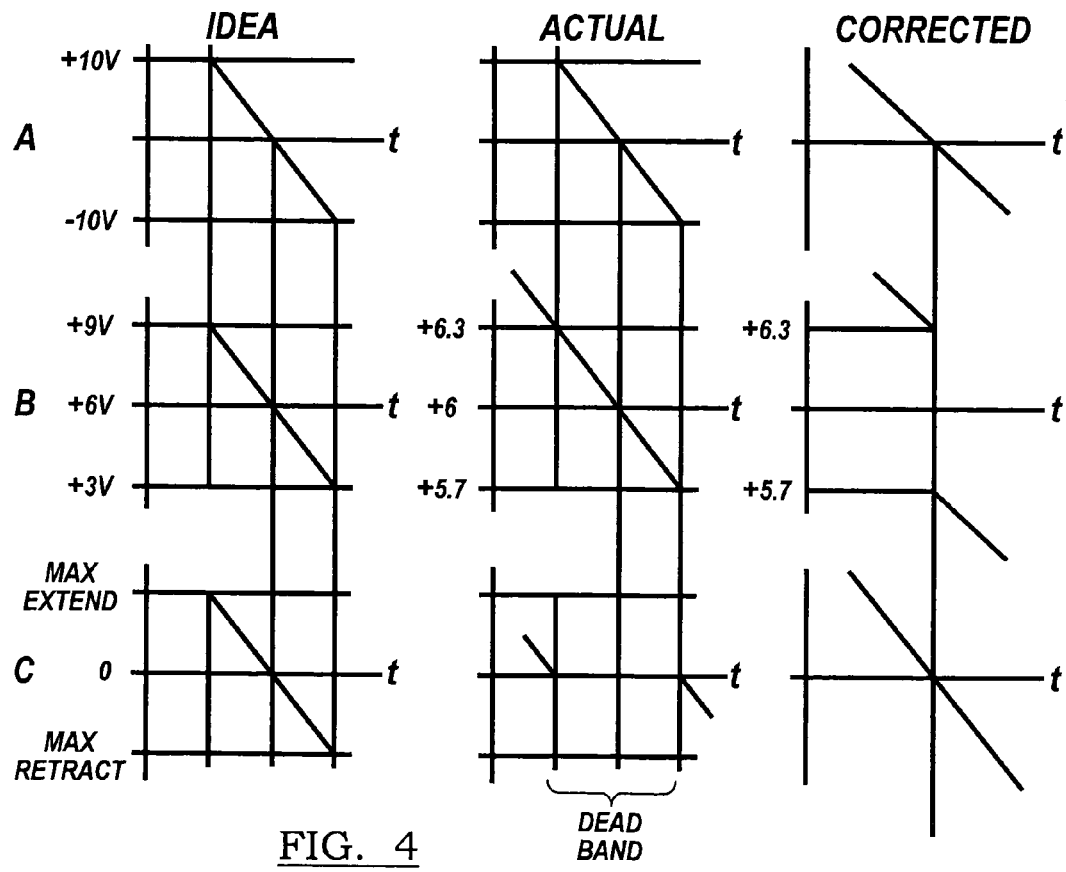

Referring to FIGS. 4 and 5, the computer puts out a signal of +10 volts to −10 volts. Zero volts output means the valve should not move, positive voltage means motion in one direction, and negative in the other direction. The valve input signal must be between +3 and +9 volts, where +6 volts results in no motion, greater than 6 results in motion in one direction, and less than 6 results in motion in the other direction. The slow response is due to a deadband of approximately +/−0.3 volts (between 5.7 and 6.3), within which the valve does not respond. The spool of the valve needs to move slightly before it starts to open up. In accordance with the invention an amplifier is provided as a way of tuning out the deadband. In other words, at any positive voltage coming from the computer, the amplifier output to the valve jumps immediately to approximately 6.3 volts, or the value that has been adjusted to the characteristics of the particular valve.

This is illustrated in FIG. 5. The block diagram illustrates that the computer output control signal (A) of +10 V is fed to the amplifier. The amplifier converts this to control signal (B), of +3 V to +9 V. This signal controls the proportional valve, which feeds hydraulic oil (C) to the robot cylinder. An encoder is physically linked to the cylinder, and provides a feedback position signal (D) to the computer.

In the ideal condition (first column—FIG. 4), there is instantaneous response. Any control signal from the computer results in oil flow immediately. In the actual condition (second column), a deadband occurs for the time during which the amplifier output goes from 6.3 to 5.7 Volts. This deadband is undesirable because the computer is looking for a fast feedback position signal from the encoder. In the corrected condition (third column), an amplifier has been specified that adds a step in the conversion of the control signal. As signal A approaches zero from +10 V, the amplifier output signal B approaches 6.3, rather than 6. As signal A approaches zero from −10 V, the amplifier output signal B approaches 5.7 rather than 6. This results in a linear response of oil flow to computer control signal. Again, the actual values may vary slightly from 6.3 and 5.7, but the amplifiers can be tuned to match the valves.

The ideal condition (first column) would mean that there is no delay between sending the control signal and receiving the feedback signal. The control loop is in a perfect balance. The robot will move exactly as you would program it. (Ideal smooth operation.)

The actual condition (second column) would mean that there is a great delay between sending the control signal and receiving the feedback signal. The control loop is way off balance. The computer expects a feedback signal within 1 millisecond. This feedback signal will take approx. 500 milliseconds. This means that the computer will increase its control signal with a predefined constant, (P-gain) every 1 millisecond for the time it does not receive a feedback signal. Be the time it receives the feedback signal, the control signal is far too great, and it will decrease the control signal again step by step for the next 500 milliseconds. This will result in complete standstill. The robot will start movement very violently and stop violently along the programmed movement, which should be smooth and linear. Normally you would just set a lower proportional setting (P-gain) for the control loop. This setting damps down the reaction on the feedback signal, and can be set within the computer software. However, the response time of the control loop is so great (bad!) that this way of setting has nearly no effect on the physical behavior of the robot.

This oscillation is quite predictable as the valves are not responsive enough to keep up with the control loop. In the corrected column the response time within the control loop has been reduced to approx. 50 milliseconds, due to the deadband correction. With the proportional (P-gain) setting in the software you can smooth out any violent reactions of the system and you are able to control the robot.

Figure 6:
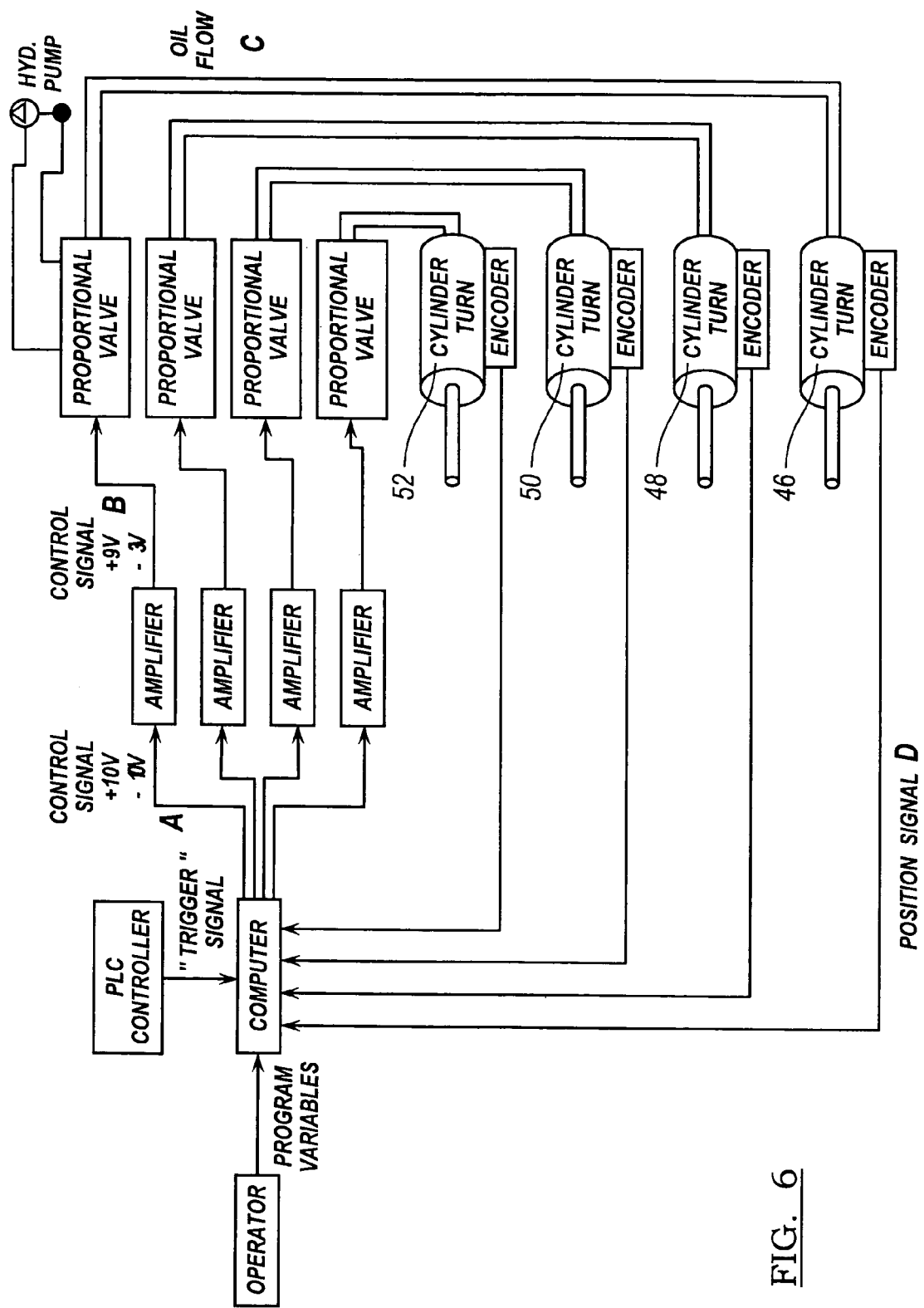
FIG. 6 is a schematic circuit diagram illustrating how the hydraulic cylinders shown in FIG. 1 are operated in accordance with the invention.

FIG. 5 illustrates the principle of including an amplifier in a hydraulic circuit to solve the "deadband" problem described previously. FIG. 6 is a schematic diagram showing the overall control circuits for the robotic sod stacker of FIG. 1 including the amplifiers for the computer-controlled proportional valves for moving the robotic arm. Note that there are actually two circuits shown—one is the hydraulic oil circuit, and the other is the electrical control circuit. Other "on-off" functions, such as actuating the gripper fingers, pusher, and accumulator conveyor, are controlled with commercially available PLC (Programmable Logic Controls).

Figure 7:
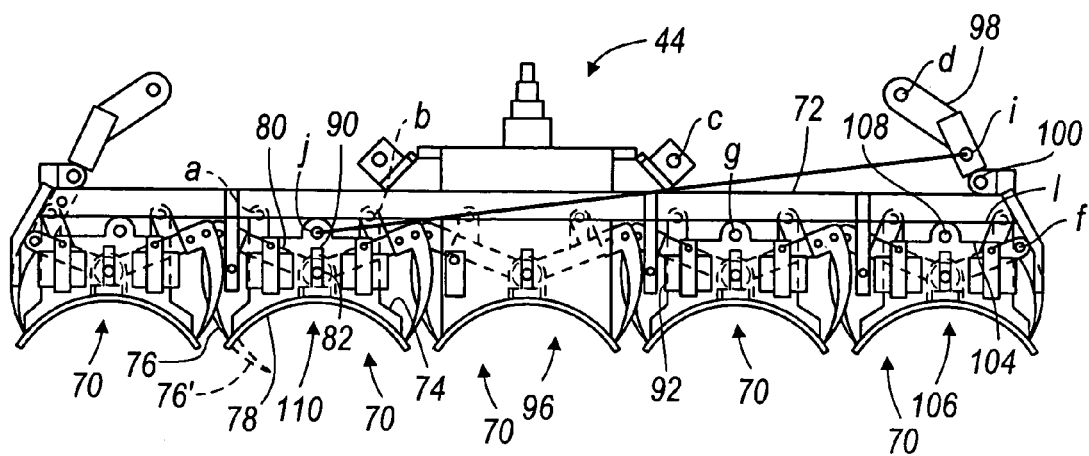
FIGS. 7 and 8 are elevational views illustrating the gripper head in accordance with the invention.
Figure 8:
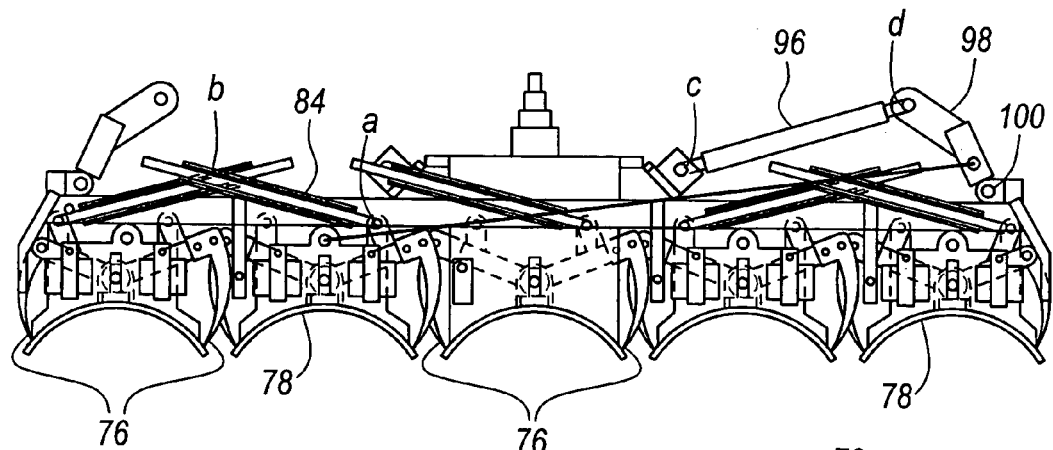
Figure 11:
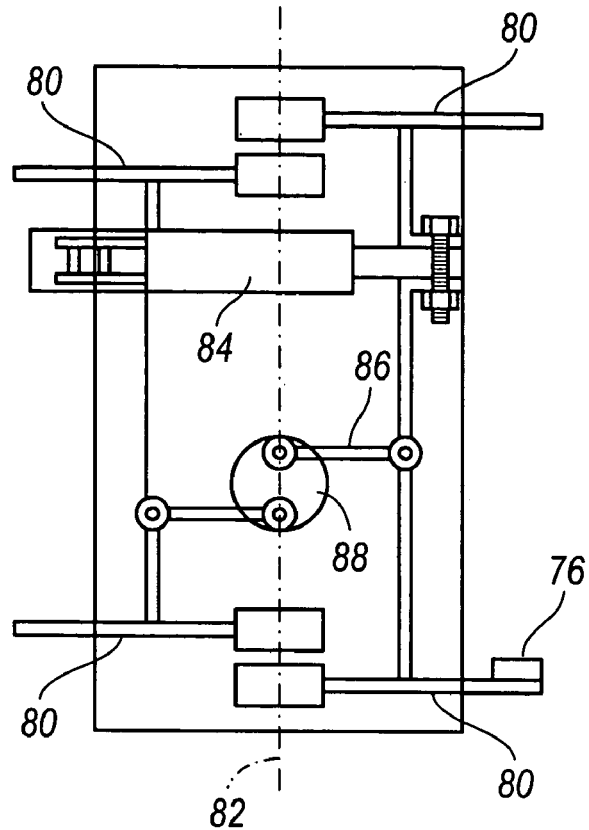
FIGS. 11 and 12 are plan and end elevational views respectively showing the gripper head.
Figure 12:
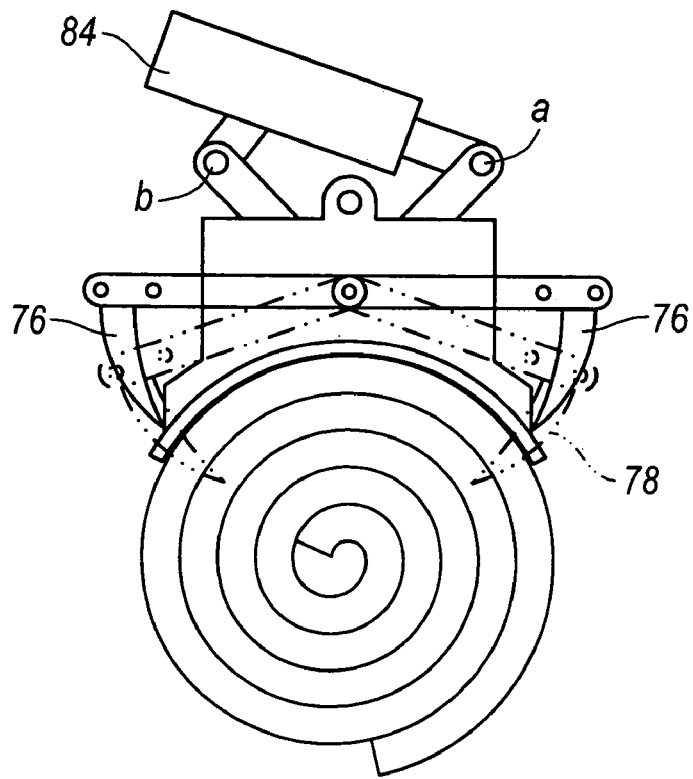
Figure 14:
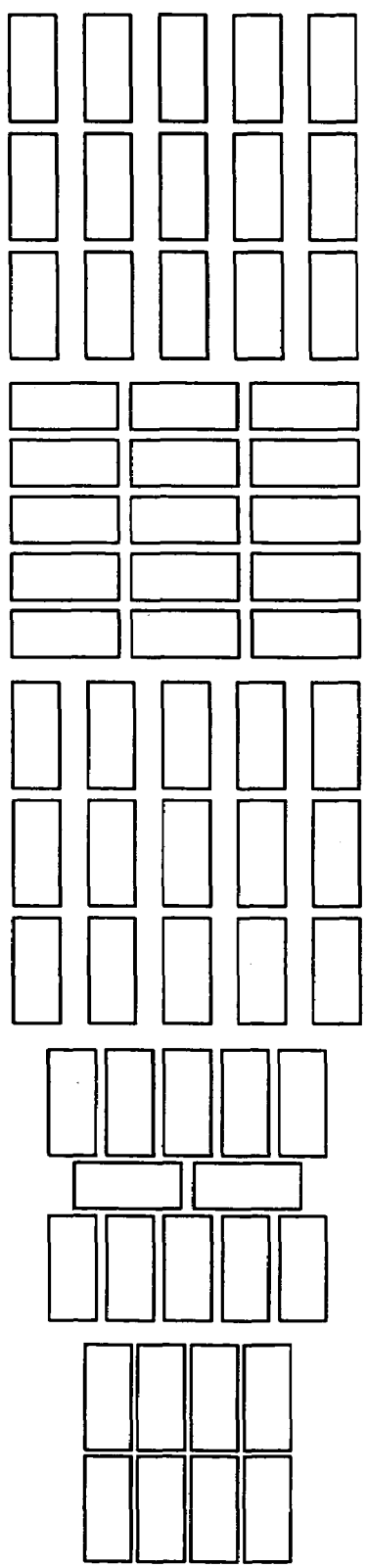
FIG. 14 comprises a number of schematic views illustrating various arrangements of sod rolls in different layers of a stack of sod that can be achieved using a sod stacker in accordance with the invention.

The pick-up head 44 will now be described in detail, initially with reference to FIG. 7. Head 44 includes five individual gripper modules 70 mounted on a common frame or support 72. Each gripper module 70 has a frame 74 and two sets of gripper fingers 76. A concave stripper 78 is part of frame 74. The two sets of fingers 76 are each mounted to a finger frame 80, which is mounted on a pivot shaft 82 on frame 74. The two finger frames 80 in each module are connected by a gripper cylinder 84 at points (a) and (b) (FIG. 8). When the gripper cylinder 84 extends, the fingers 76 rotate to a position 76' below the stripper 78. With this motion, a roll of sod is released. Provision is made to insure that the roll of sod is dropped in a controlled way, that is, to prevent one set of fingers from retracting before the other set, which could result in the roll moving out of position. This provision is accomplished by tying the two finger frames 80 together with links 86 (FIG. 11). Each link 86 is connected at one end to a finger frame, and at the other end to a disc 88, which pivots on a vertical shaft 90 mounted to frame 74. As the gripper cylinder 84 extends and retracts, the disc 88 rotates, and the two finger frames 80 are constrained to move the same distance.

It is desirable for the 5 pairs of gripper fingers to operate simultaneously. This can be achieved by a 5-way flow divider or series connection. One or more gripper cylinders can be selectively isolated with selector valves to allow one or more rolls of sod to be dropped independently of the others.

Four of the five gripper modules 70 are mounted to the frame 72 in a way that allows them to slide toward and away from each other. This allows the machine to place rolls of sod onto a stack at one (wider) spacing on lower levels, and a different. (closer) spacing on upper levels. This method of stacking is commonly used with manually stacked sod to give greater stability to the stack. Each of the four sliding gripper module frames 74 includes to pairs of linear bushings 92. Instead of a two pairs, two individual (longer) bushings could also be used. The bushings 92 slide on two rods 93, one clamped, rigidly to each side of the pick-up head frame 92. A fifth gripper module 96 is rigidly connected to the pick-up head frame 72.

Figure 13:
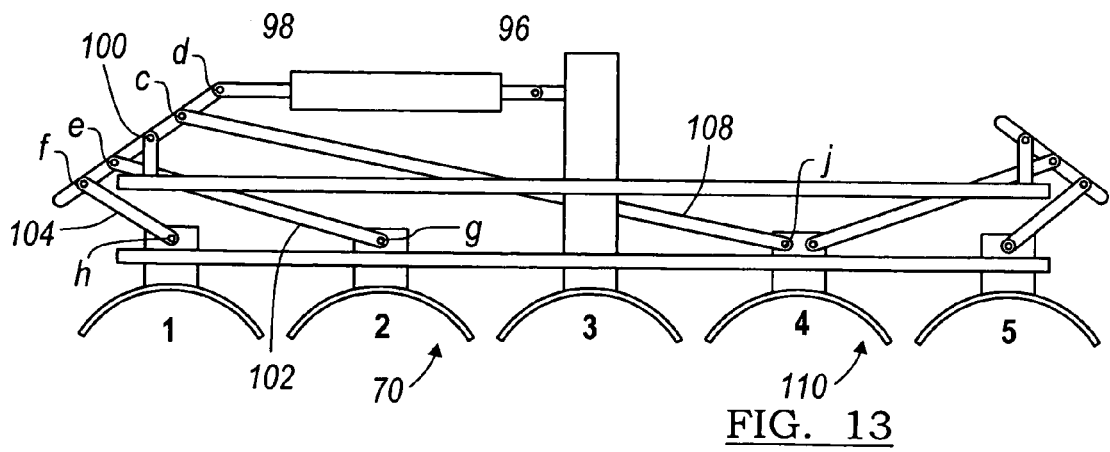
FIG. 13 is a schematic elevational view of the gripper head as seen in FIGS. 7 and 8, illustrating a feature of the gripper head design.

As best seen in FIG. 13, the sliding of the fifth gripper module 96 is accomplished by two slider cylinders 96. Each slider cylinder 96 is connected at one end to the pick-up head frame 72 at point (c). At the other end, the slider cylinder is connected at point (d) to a crank frame 98. Crank frames 98 are mounted to the pick-up head frame by a pivot shaft 100. Crank frame 98 also has points (e) and (f), which are the connecting points for links 102 and 104. Link 102 connects point (e) of the crank frame to point (g) of gripper module 70. Link 104 connects point (f) of the crank frame 98 to point (h) of gripper module 106.

When cylinder 96 retracts, crank frame 98 rotates counterclockwise about pivot shaft 100. This pulls on the links 102 and 104, and moves the gripper modules 70 to their outer position, which spaces the sod rolls apart. When cylinder 96 extends, crank frame 98 rotates clockwise about pivot shaft 100. This pushes the links 102 and 104, and moves the gripper modules to their inner position, which spaces the sod rolls closer together. Since point (f) is twice as far away from pivot shaft 100 as point (e) is, gripper module 106 moves twice as far as gripper module 70. Thus, gripper module 106 moves the same distance closer to gripper module 70 as gripper module 70 moves to stationary gripper module 96. In both the inner and outer positions, the sod rolls are thus spaced evenly.

The same sliding action is happening to the other two gripper modules 70 at the other end of the pick-up head. To synchronize the motion of the two sets of gripper modules, another link 108 is provided. Link 108 connects point (i) on crank frame 98 to point (j) on module 110. This constrains the two pairs of gripper modules to slide in and out at the same speed. This allows the sliding motion to take place with the least amount of acceleration to disrupt the sod rolls.

Figure 17:
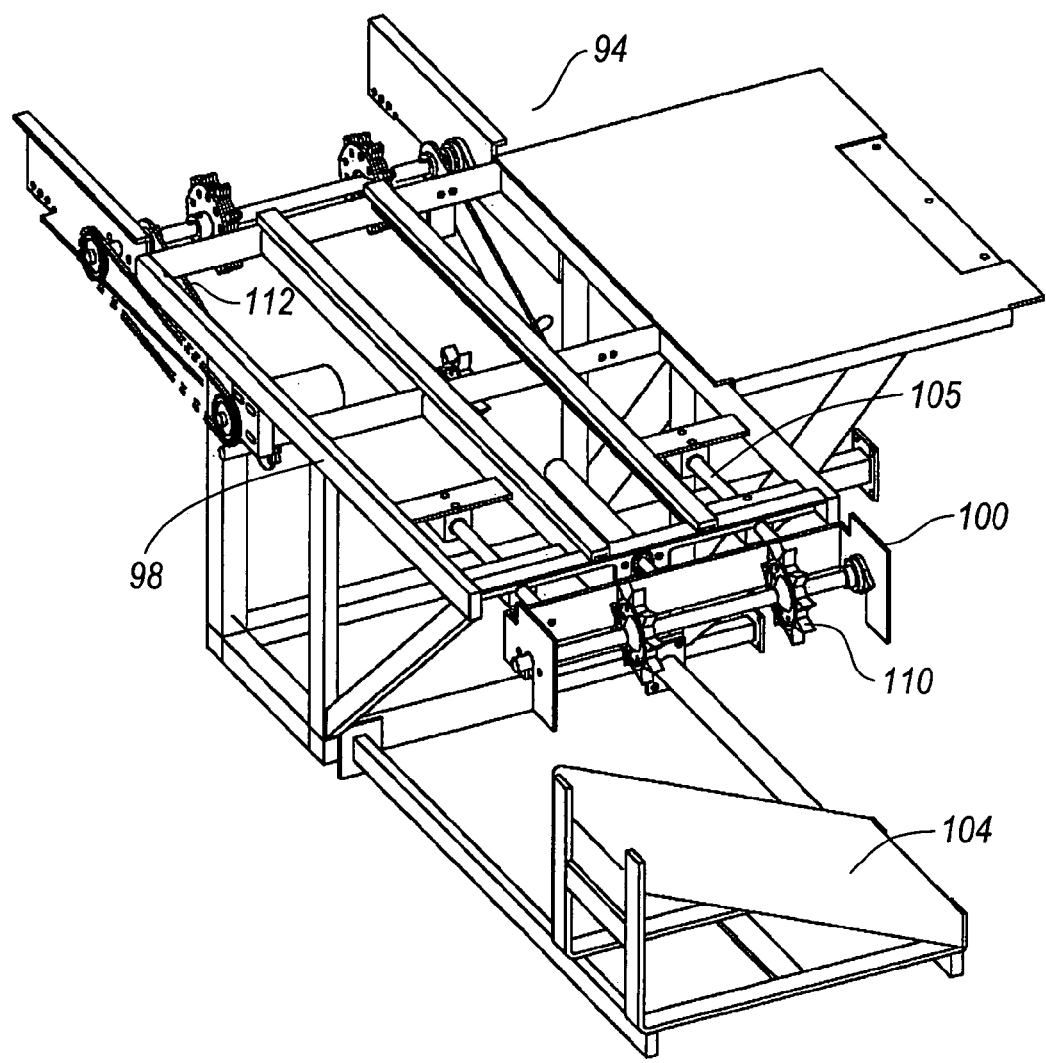

FIGS. 16 and 17 represent an alternate accumulator conveyor 94 according to another embodiment of the present invention. The accumulator conveyor 94 is formed of a support frame 96 that is configured to support a accumulator conveyor frame 98. Coupled to the frame 98 is a bypass mechanism 100. The bypass mechanism functions to allow the operator to reject particular rolls of sod. In this regard, the operator actuates the bypass mechanism 100, which retracts a portion of the accumulator conveyor 94. By retracting the accumulator conveyor 94, the operator can cause the roll to drop onto a ramp 104 allowing the roll of sod to fall onto the ground.

The retraction bypass 100 comprises three retractable support arms 105 which support a first conveyor sprocket 110. Additionally, the retractor mechanism has a retractable idler type arm 112 which, when actuated, pulls the sprocket 110 toward the rear of the vehicle. Upon actuation, the idler arm 112 is rotated about the first pivot point, lowering the sprocket down and increasing the tension on the accumulator conveyor 94. The applied tension functions to pull the biased retractable arms 105 into the support frame 98. After releasing the bypass mechanism 100, biasing springs or air cylinders (not shown) coupled to the retractable arms 105 function to push the support arms 105 and thus the first conveyor sprocket 110 into its original orientation.

Figure 18:
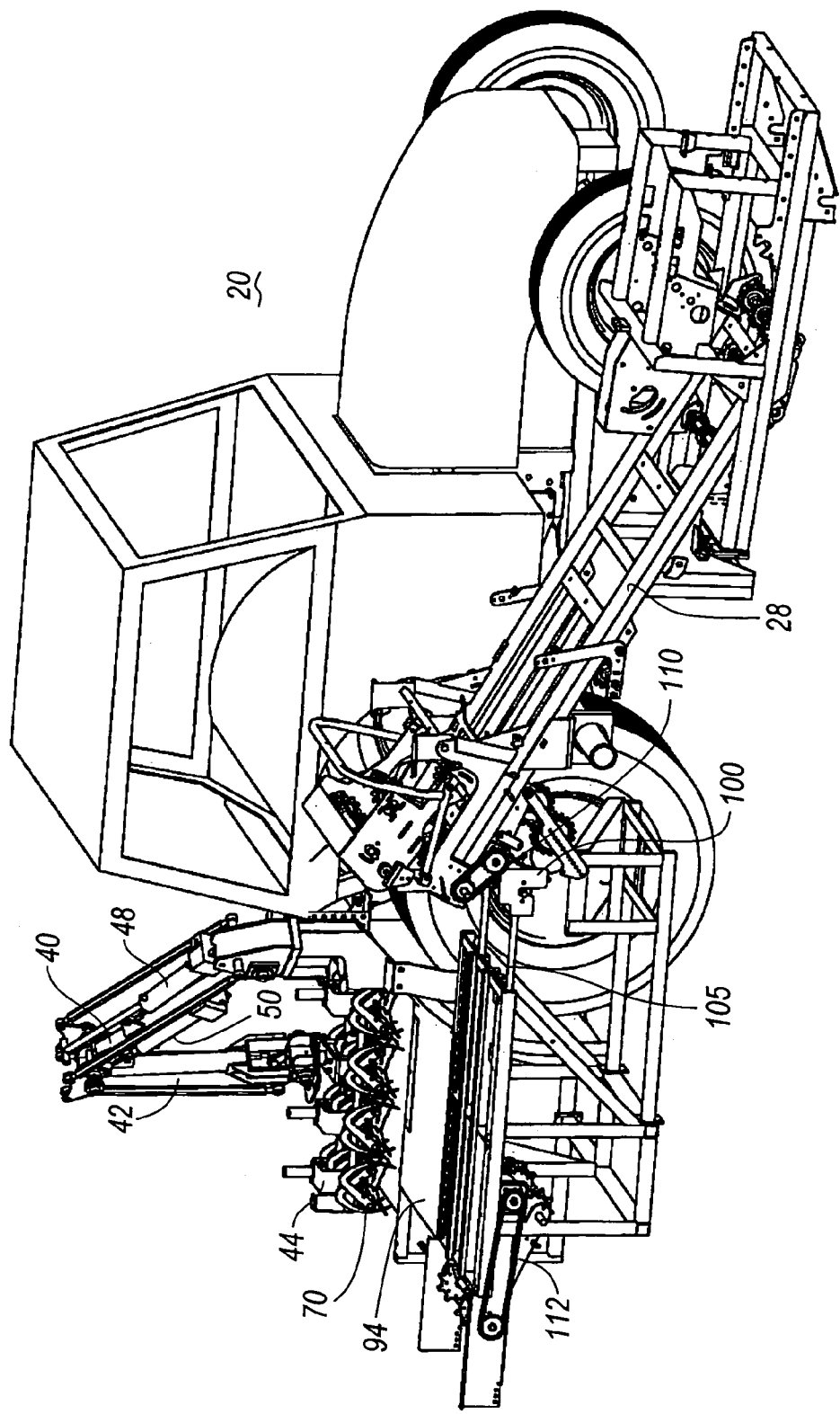
FIG. 18 represents a perspective view of a sod harvester according to the teachings of the present invention.

FIG. 18 shows a vehicle utilizing the alternate system of the present invention. As previously mentioned, the cutting assembly can be co-linear with the conveyor and accumulator mechanism 94. The robotic arm functions to remove the rolled sod from the accumulator 94 and position it onto a pallet as previously mentioned. As shown, the accumulator mechanism 94 can contain a plurality of baskets.

Significant features of this aspect of the invention are the concept of squeezing the rolls together with the sliding action, and the ability to drop one roll separately from the other four. This allows eight rolls to be placed on the top layer, and ten on the next one down. This contributes to a more stable stack.

Figure 20A:
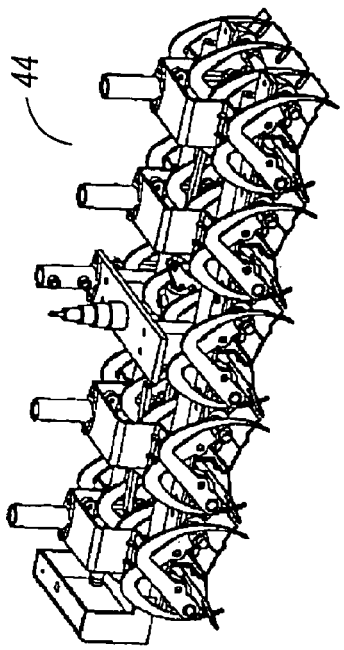
FIGS. 20*a*–20*e* represent the pick-up heads represented in FIGS. 19*a*–19*b* with the grippers disengaged and the heads in a retracted position.
Figure 20B:
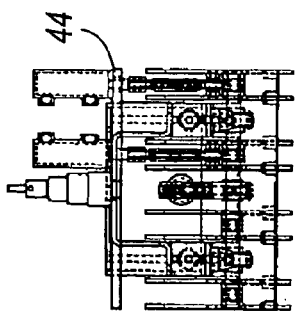
Figure 20E:
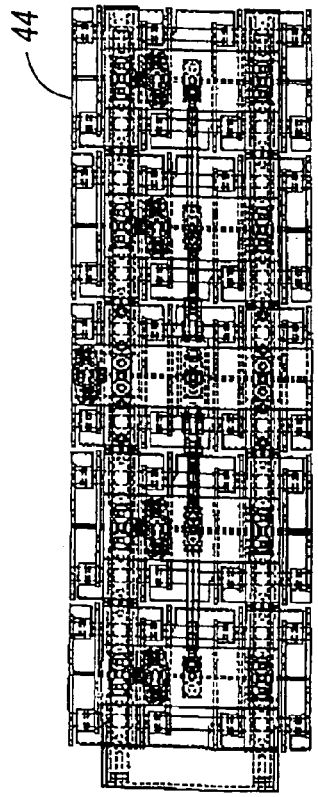
Figure 20C:
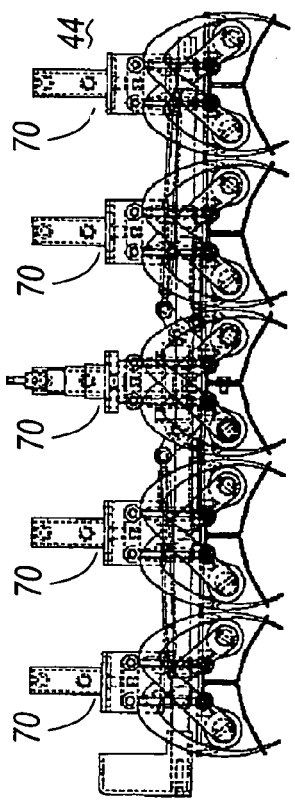
Figure 20D:
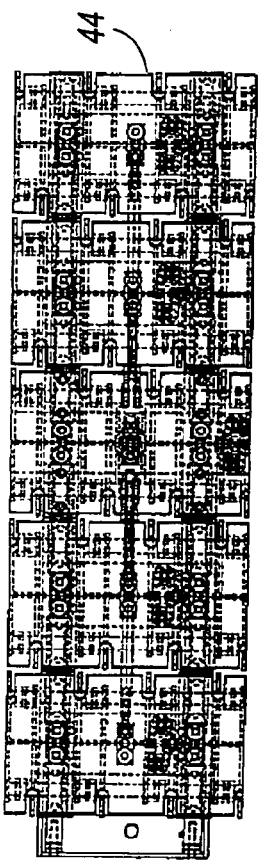
Figure 21A:
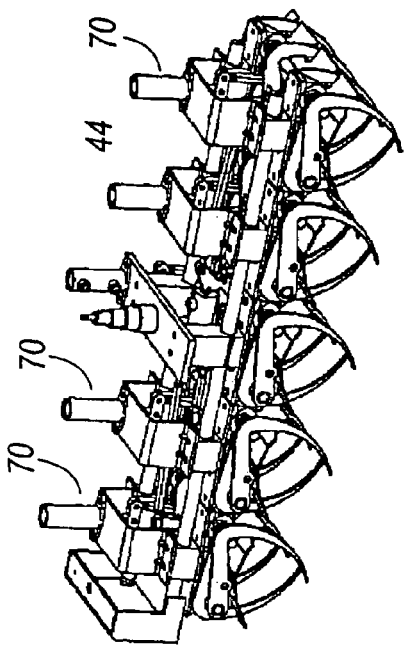
FIGS. 21*a*–21*e* represent the pick-up heads represented in FIGS. 19*a* and 19*b* with the grippers engaged and the heads in an extended position.
Figure 21B:
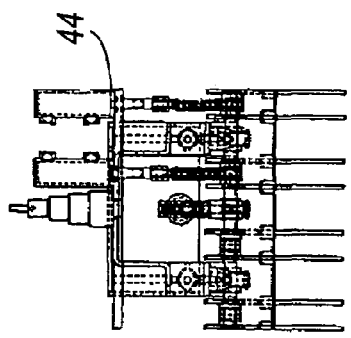
Figure 21E:
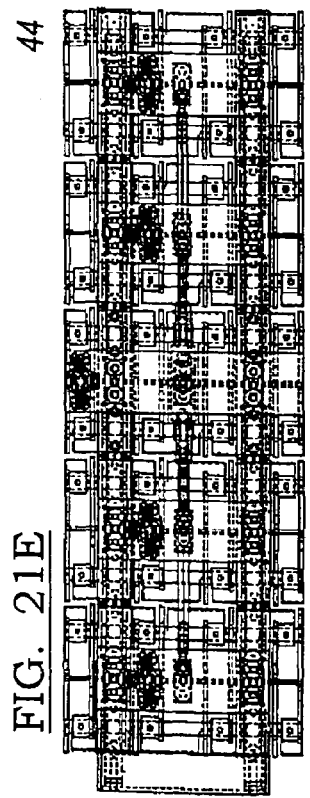
Figure 21C:
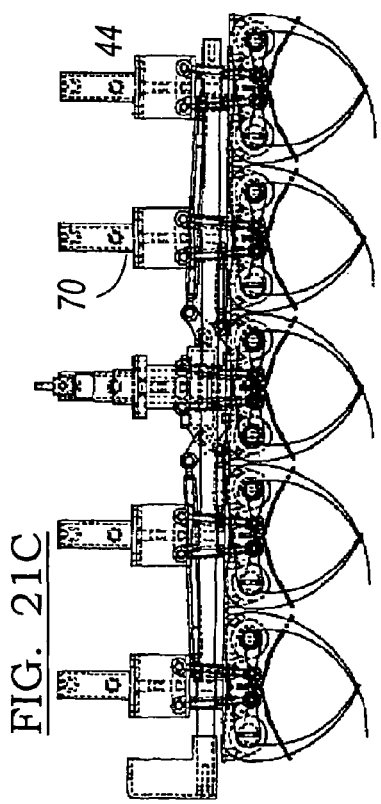
Figure 21D:
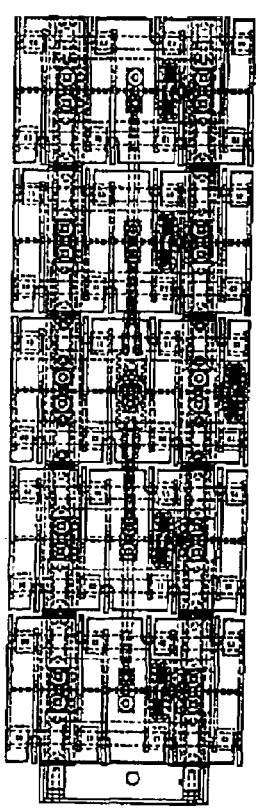

FIGS. 19a and 19b represent alternate linkages for the pick-up head 44; four of the five gripper modules 70 are mounted to the frame 72 in a way that allows them to slide toward and away from each other. This allows the machine to place rolls of sod onto a stack at one (wider) spacing on lower levels, and a different (closer) spacing on upper levels. This method of stacking is commonly used with manually stacked sod to give greater stability to the stack. Each of the four sliding gripper module frames 74 are coupled to linkages 101 or 102. The linkages 101 or 102 are then coupled to an actuator 104 through a plurality of rotatably coupled members 107. As shown in FIG. 20b, retraction of the actuator 104 causes the rotation of the coupling members 107 about their respective pivot points 111. This rotation of the coupling members 107 applies forces to the linkages 101 or 102 causing the displacement of the four of the five gripper modules 70. The fifth or central gripper module 96 is rigidly connected to the pick-up head frame 72.

FIGS. 20a–20e represent the pick-up heads represented in FIGS. 19a–19b with the grippers disengaged and the heads in a retracted position.

FIGS. 21a–21e represent the pick-up heads represented in FIGS. 19a and 19b with the grippers engaged and the heads in an extended position.

Figure 22:
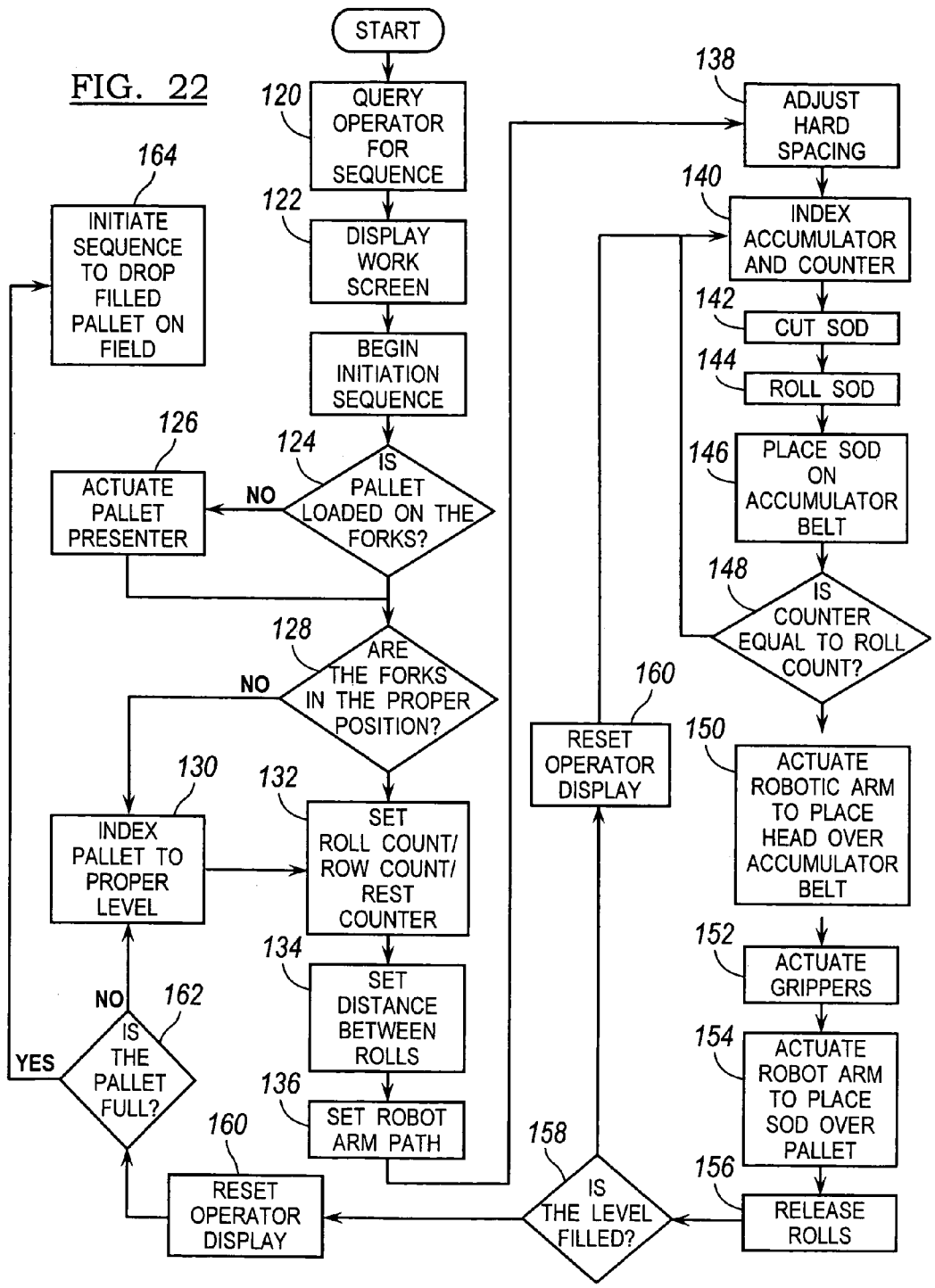
FIG. 22 represents a flow chart of the control of the system shown in FIG. 1.
Figure 23A:
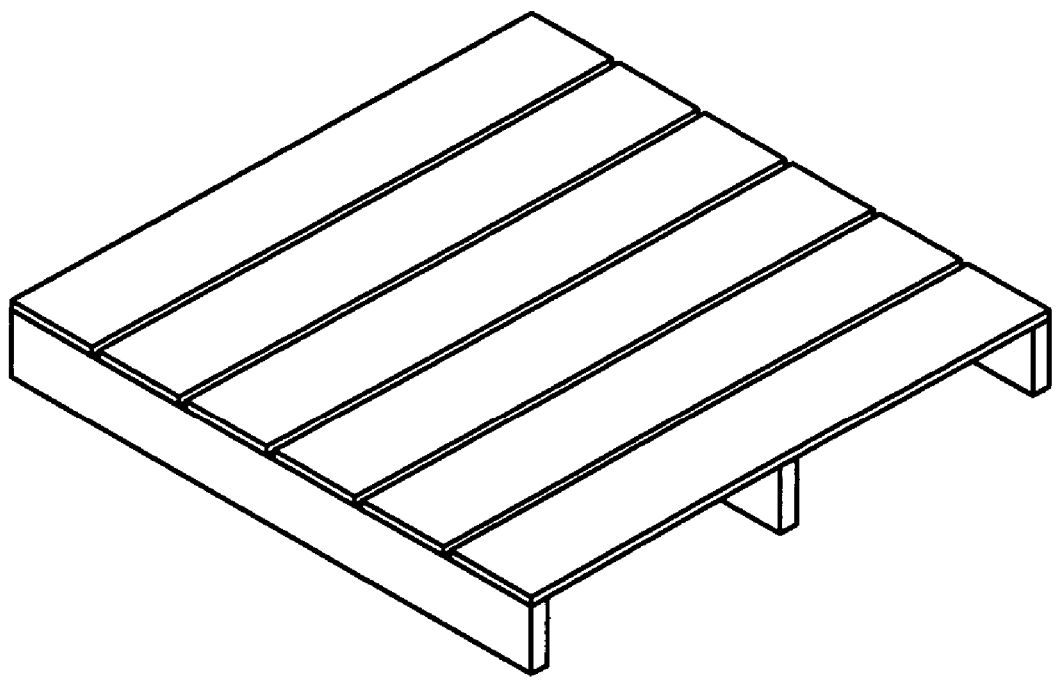
FIGS. 23*a*–23*i* and 24 depict visual elements shown on a control panel of the present invention.
Figure 23B:
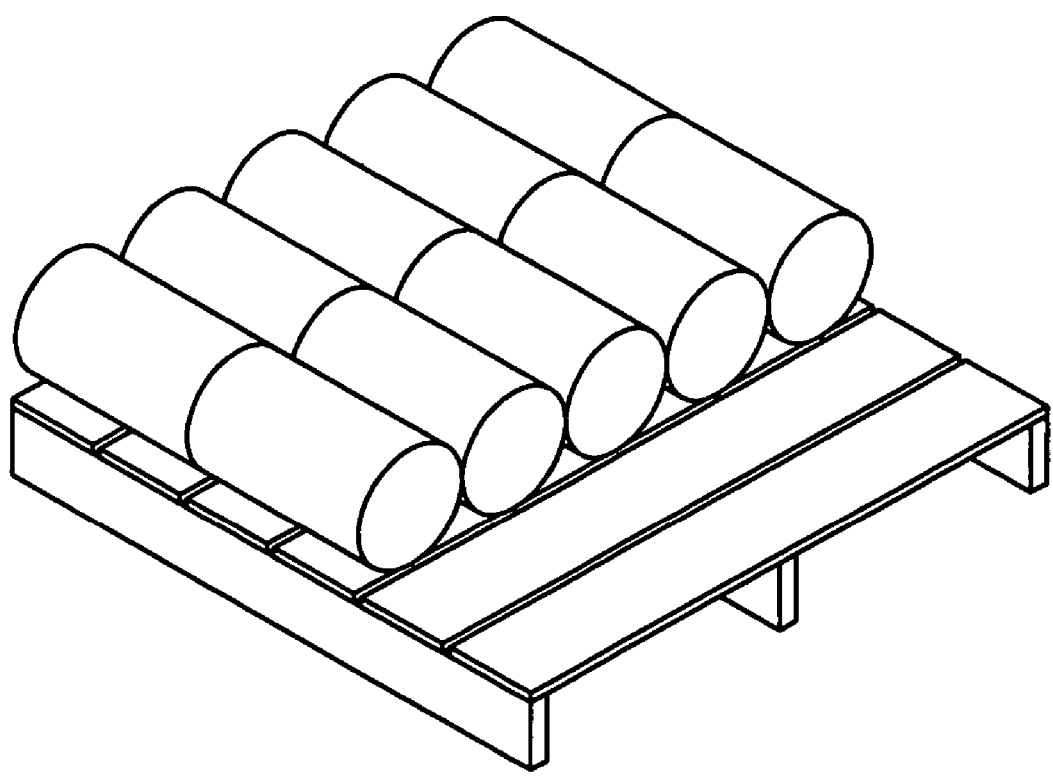
Figure 23C:
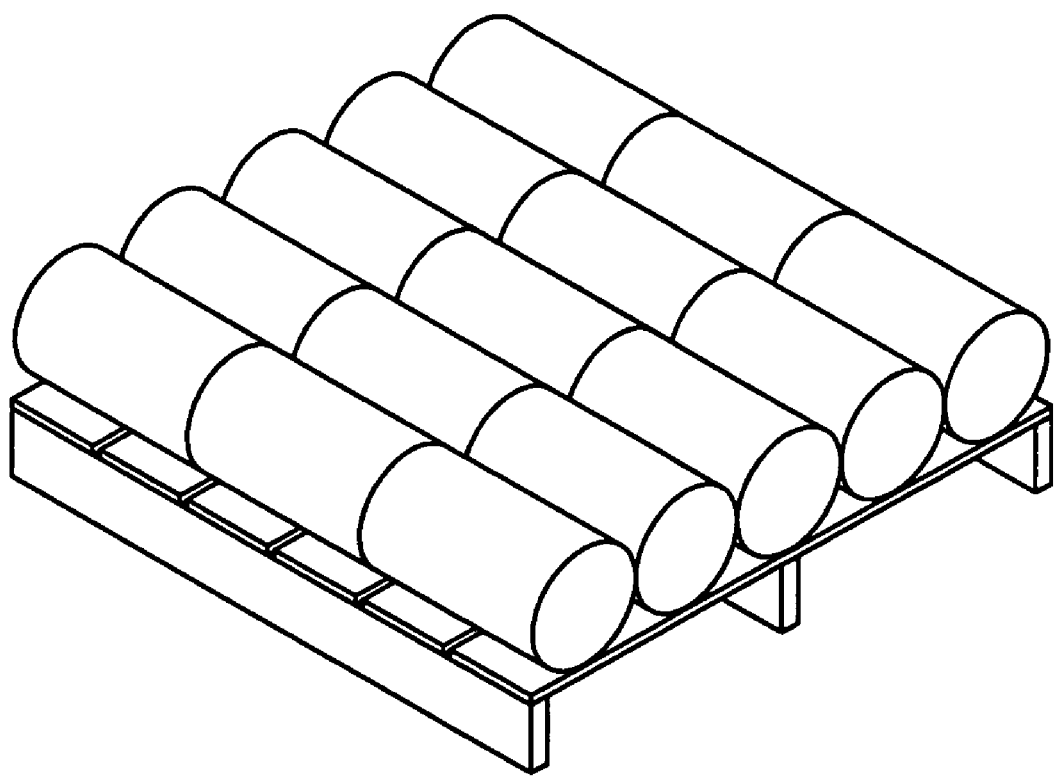
Figure 23D:
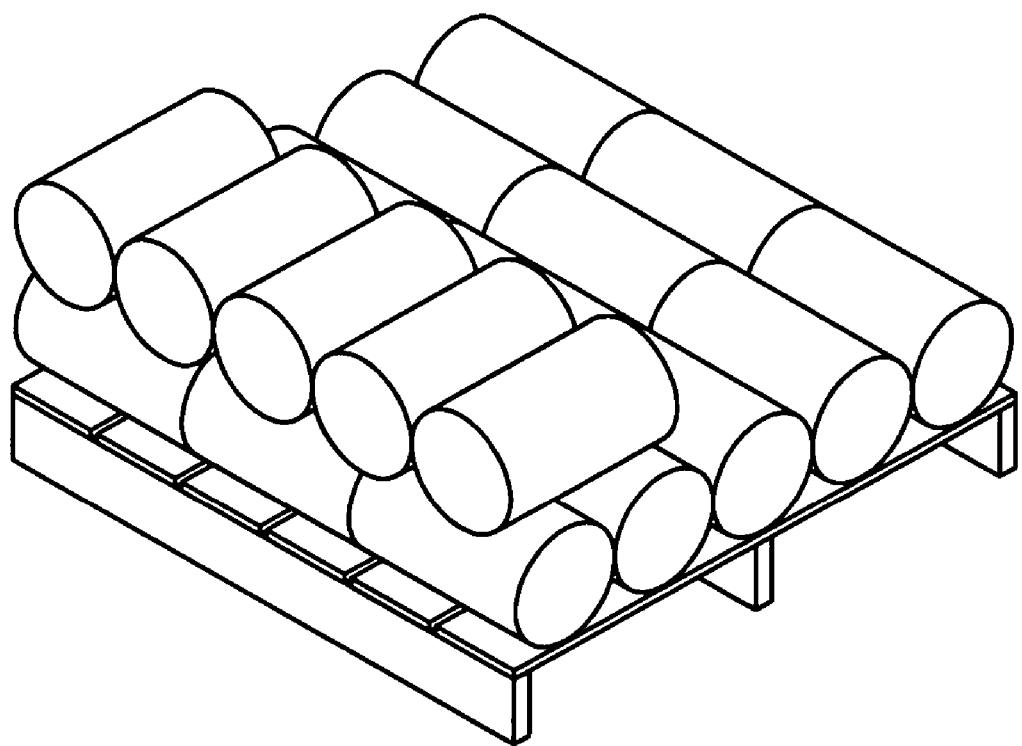
Figure 23E:
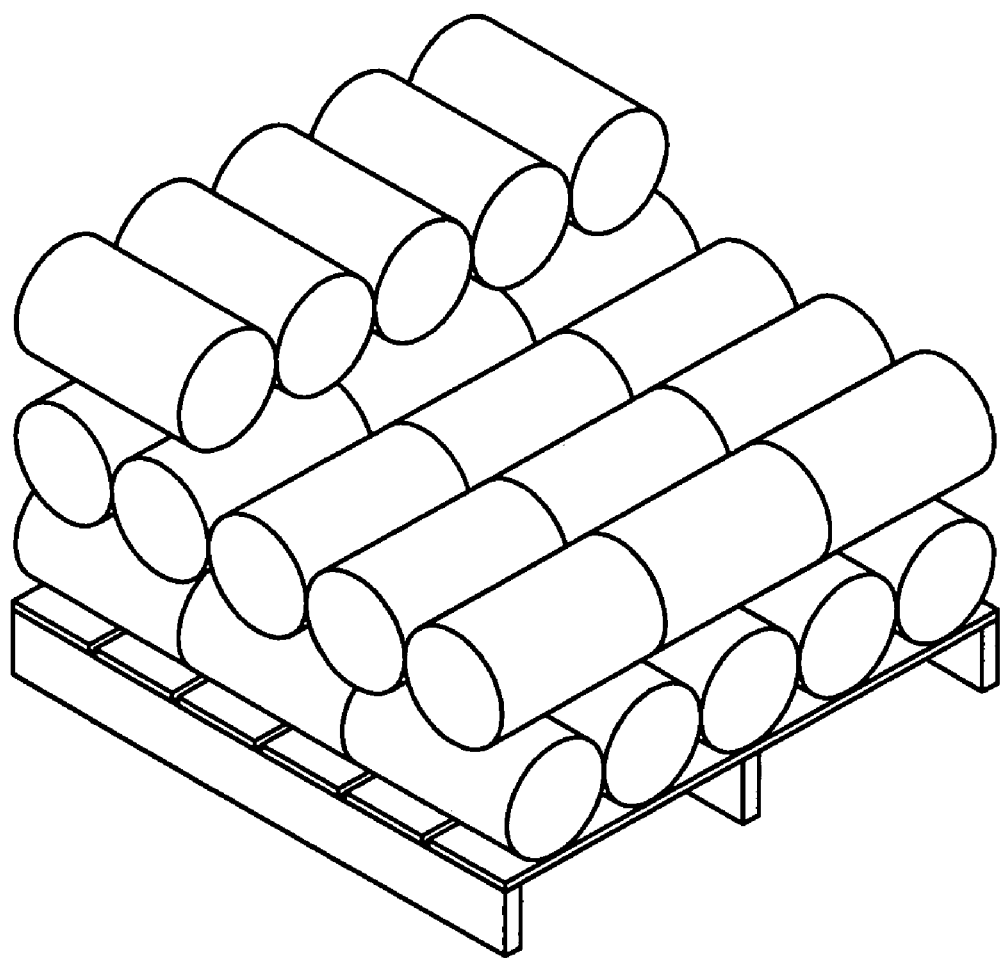
Figure 23F:
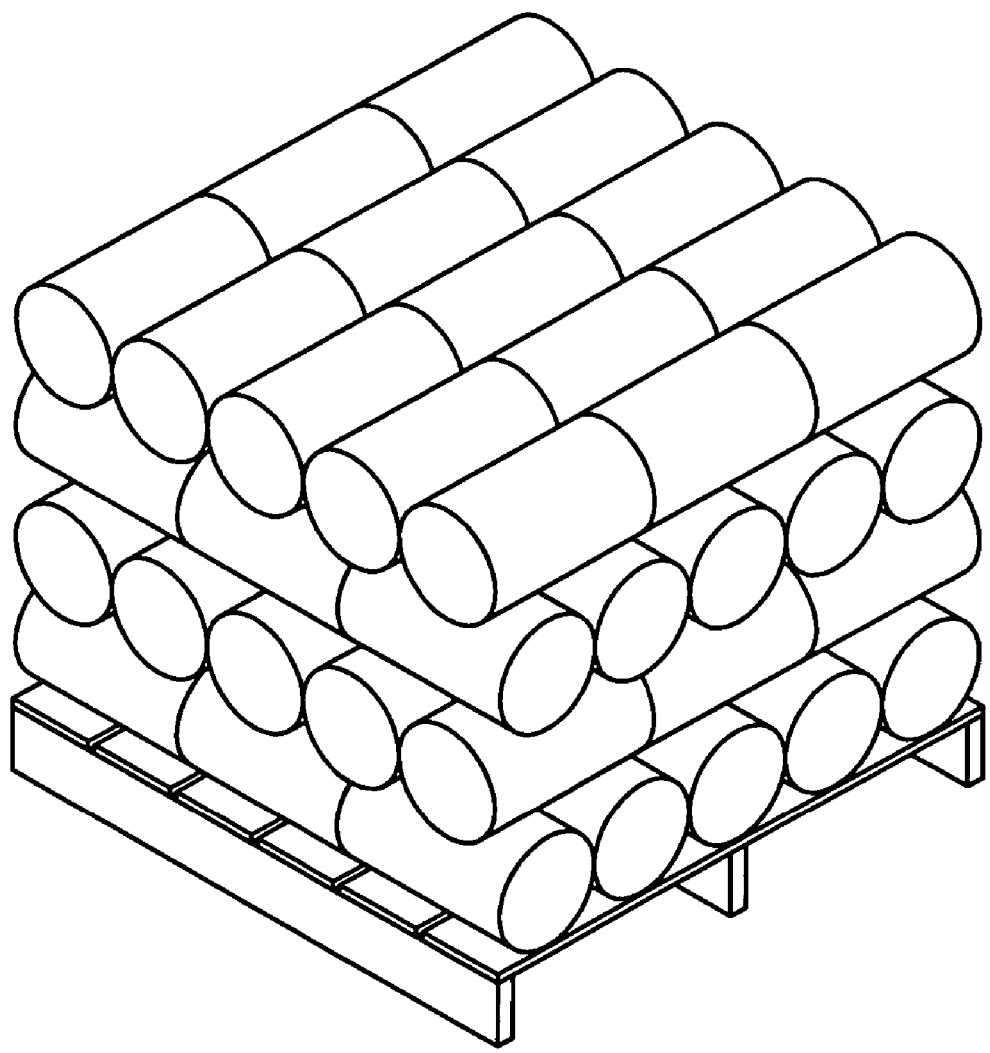
Figure 23G:
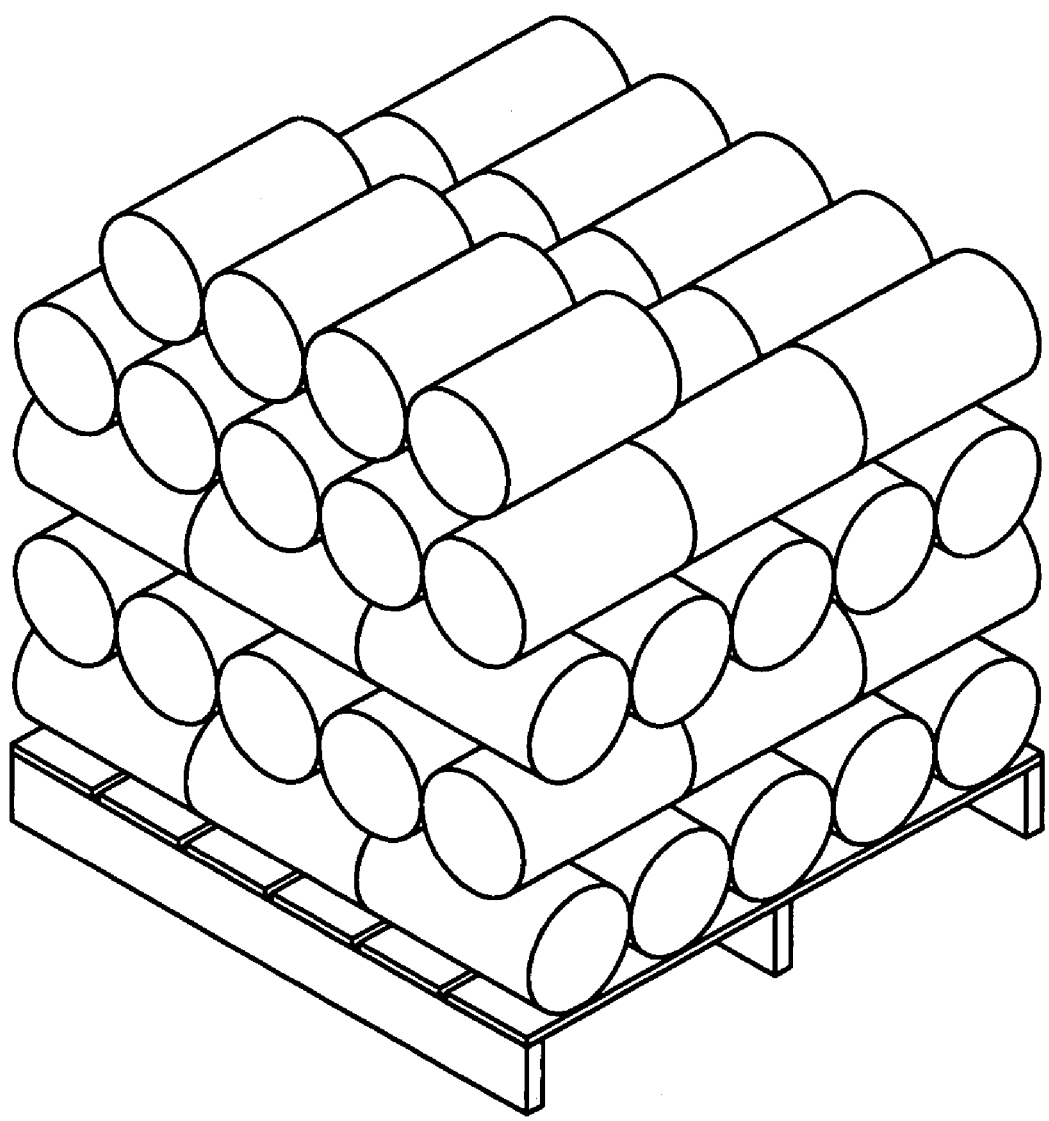
Figure 23H:
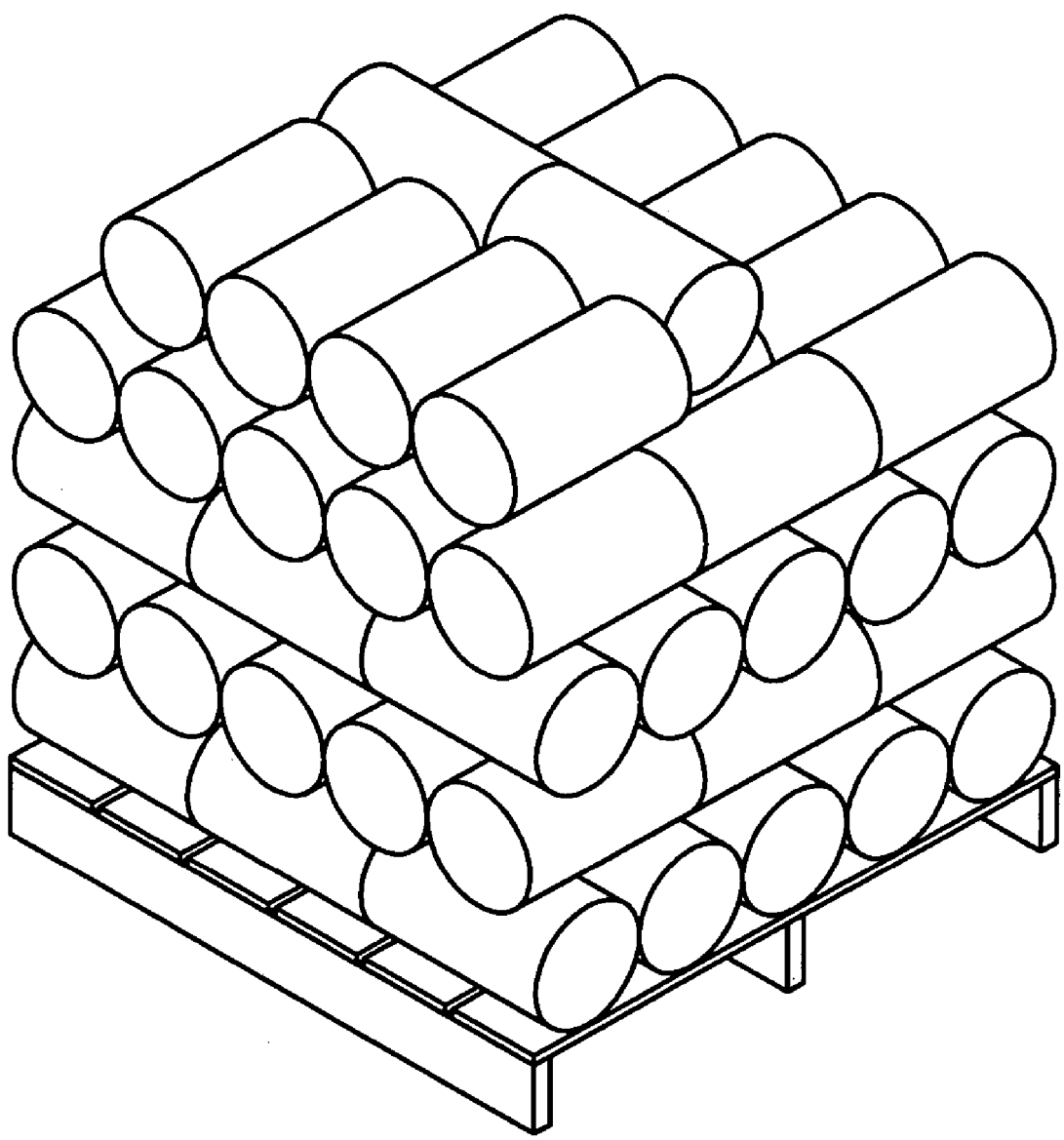
Figure 23I:
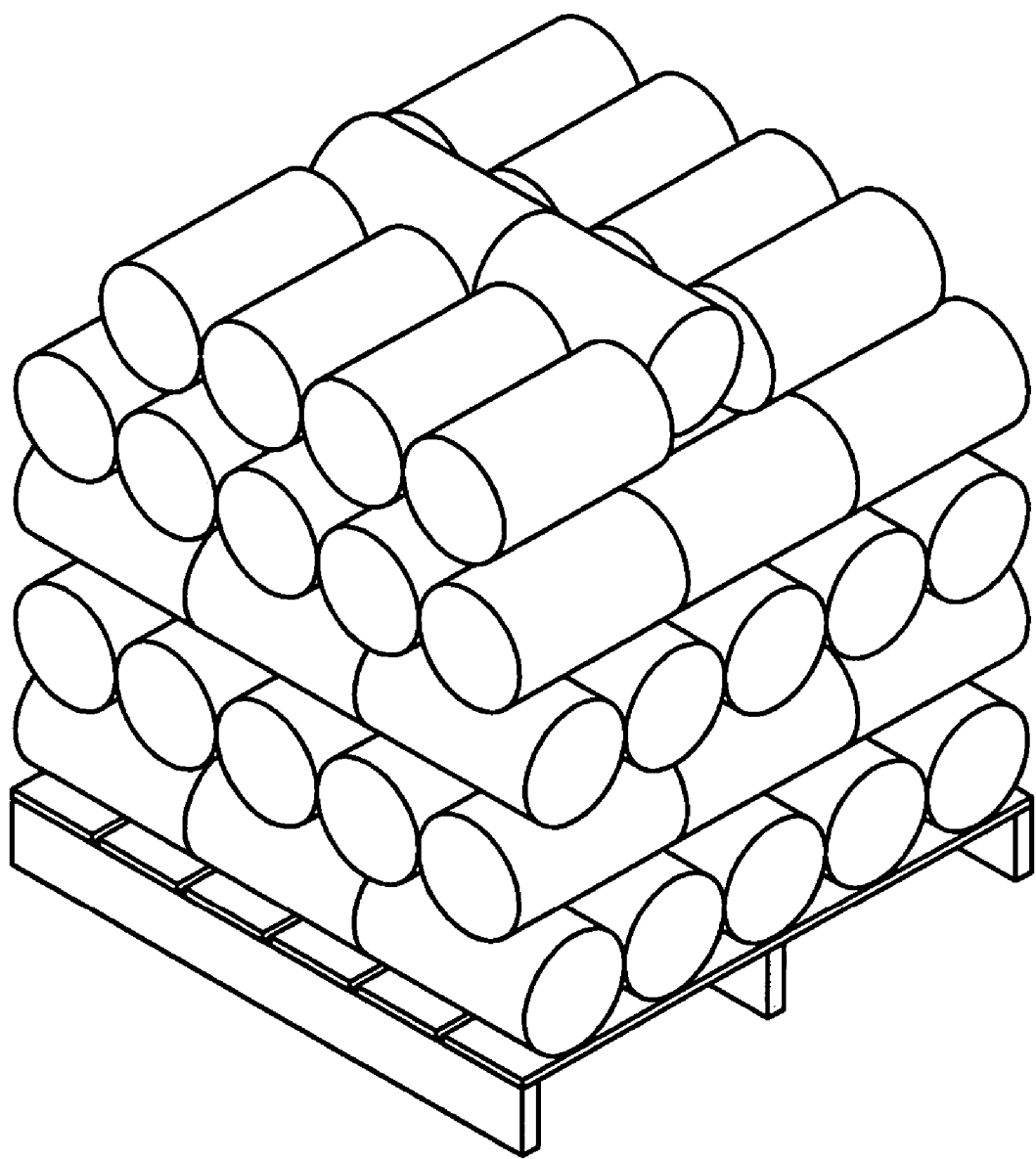
Figure 24:
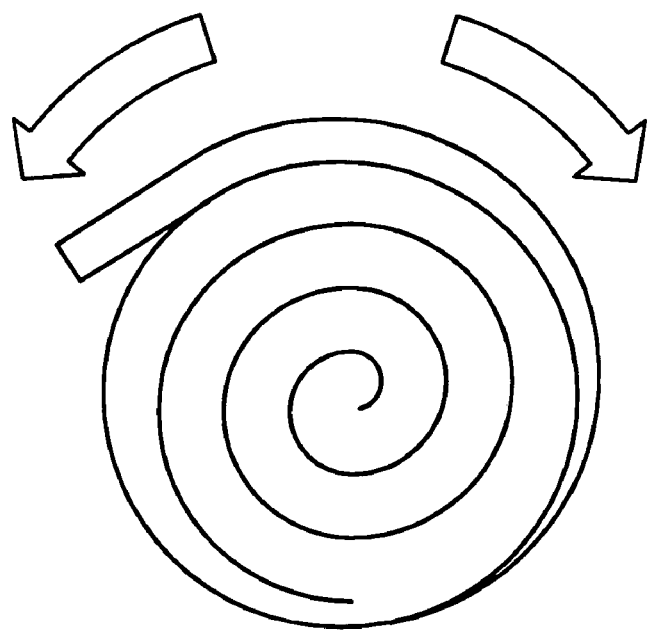

FIG. 22 represents a flow chart of the operation of the system of the present invention. While the flow chart is shown using loop until program flow structures, applicant notes that other programming structures such as, but not limited to for/next and Do loops are useable and equivalent. The system utilizes a controller which either directly controls or which enables components in the system to operate. The process beings with query block 120 which queries the operator as to the requited stack configuration. In this regard, the operator is presented with a number of optional sod stack configurations on a computer display in process block. The operator selects the required stack configuration. Associated with each of these stack configurations is a predetermined number of robotic arm movement patterns as well as pallet indexing and sod spacing information. After completing the query, the system displays a work screen in process block 122. The work screen contains a pictorial representation of the pallet while it is being loaded with sod. In this regard, the operator can check the status of a pallet by watching the screen (see FIGS. 23a–23i).

Should the system have an optional pallet presenter, the system determines if there is a pallet loaded on the forks in process block 124. It there is no pallet on the forks, the system actuates a pallet presenter in process block 126 to place the pallet on the forks. The system begins pallet loading by indexing the pallet into its proper orientation. Based upon which stack configuration is chosen by the operator, the roll count per row and the number of rows for a given layer is sod is retrieved from a memory location 132. Further retrieved from memory and set is the spacing between the rows and the spacing of the gripper modules of the head 138. The robotic arm's path is retrieved and set in operation block 136.

The system begins cutting sod in process block 140. The sod is rolled in process block 144 and is placed onto the accumulator belt 146. This process is repeated until all of the desired rolls of sod are positioned on the accumulator belt 148 for a given row. As can be seen in FIG. 23, the orientation of the sod roll can be adjusted by the operator. In this regard, the adjustment occurs by regulating the time of rolling of the strips of sod on the conveyor to effectuate the desired roll orientation. The robotic arm is then actuated 150 to place the head over the filled accumulator. The grippers are actuated in process block 152 to grasp the rolls of sod.

The robotic arm moves the row of sod rolls over the stack in process block 154 and releases the sod in process block 156. As previously described, the system can optionally use feedback from the actuators or the measurement of the movement of the component through the use of encoders to determine the proper time to release the sod onto the stack. The system then determines if a particular level of sod is complete in query block 158 and resets the operators display in block 160. Query block 162 determines if the pallet is full. Should the last row of sod be placed on the stack, the system initiated the deposition of the sod stack onto the field. This may be an automatic process where the system lowers the sod stack onto the field, or the system may prompt the operator to initiate the sequence to start the loading of the next row of sod. In the event that more sod must be placed on the pallet, the system in process block 130 indexes the forks to a new position, and resets the appropriate counters.

To summarize the basic operation of the stacker is as follows:

1) Sod is cut and rolled using the current, established method.

2) The roll is ejected from the rear of the main conveyor. Here, it drops in front of a pusher, which pushes it to the left, onto a buffer conveyor. Alternatively, the roll is dropped from the main conveyor directly onto the accumulator belt;

3) The buffer or accumulator conveyor indexes until it contains up to 9 rolls of sod.

4) A robotic arm picks up, up to 5 rolls of sod from the buffer conveyor, and places them onto the stack.

5) The robotic arm as instructed by the controller continues placing sod on the stack, in a different position and orientation every time, until the stack is complete.

6) The operator stops forward motion of the harvester, backs up to drop off the stack, and re-starts the robot.

The robotic auto-stacker has some commercial advantages over alternative designs. It is light-weight and small, fitting approximately within the envelope of a traditional tractor-mounted sod harvester. It is flexible; the robot can be programmed to stack 16 or 24 inch wide sod rolls, into stacks of different heights. The pick-up head has two features, which can be used to stack the top two layers in a "pyramid" fashion. The five grippers 70 on the pick-up head can be squeezed together, which will compress the row as it is placed on the stack. Also, one of the five rolls can be dropped independently, which allows you to stack the next to the last layer with two rows of five, with two individual rolls turned sideways in between, and the last layer with four rolls each. The robot actually picks up and repositions one of these rows after it is initially placed. In other words, there is a high degree of flexibility in how the sod is stacked, and a stable stack can be achieved without extra wrapping.

In addition to the small size and flexibility, the machine is expected to cost less than other autostackers currently on the market. This is partly due to the use of low-cost proportional valves, instead of higher-cost servo valves. This is made possible by a unique interface between the controller and the valve.

The description of the invention is merely exemplary in nature and, thus, variations that do not depart from the gist of the invention are intended to be within the scope of the invention. Such variations are not to be regarded as a departure from the spirit and scope of the invention. Particularly, while the system is disclosed for transferring rolls of sod using a robotic arm, it is envisioned that the arm can be used to transfer stacked slabs of sod.

What is claimed is:

1. An apparatus for cutting and stacking rolls of sod comprising:
    a wheeled chassis for traversing a sod field;
    a horizontal cutting mechanism for cutting a plurality of sod strips;
    an accumulator configured to hold the plurality of sod strips;
    a sod roller configured to roll the sod strips prior to transferring the sod to the accumulator;
    a conveyor configured to transfer sod from the cutting mechanism to the accumulator;
    a robotic arm configured to lift the plurality of sod strips from the accumulator to a sod storage location; and
    a controller configured to querying an operator for a predetermined sod stack configuration;
    the controller configured to set a first counter to a first initial condition indicative of a number of rolls of layers of sod;
    the controller configured to set a second counter to a second initial condition indicative of a number of rolls of sod per layer;
    the controller configured to set a third counter to a third initial condition indicative of a number of rolls of sod per row;
    if the first counter is less than an first initial condition, the controller is configured to perform the following:
        if the second counter is less than a second initial condition, the controller is configured to perform the following:
            if the third counter is less than an third initial condition, the controller is configured to perform the following:
                enable the horizontal cutting mechanism to cut a strip of sod,
                enable the sod roller to roll the sod,
                enable conveyance of the sod roll to an accumulator belt,
                enable indexing of the accumulator belt to receive another roll of sod,
                incrementing the third counter;
            instructing a robotic arm to pick up, a plurality of rolls of sod from the accumulator belt,
            instructing the robot arm to move the sod to a pallet,
            incrementing the second counter;
        incrementing the level of the pallet; and
    incrementing the first counter.

2. The apparatus according to claim 1 wherein the accumulator is a segmented conveyor.

3. The apparatus according to claim 1 wherein the accumulator comprises a retractable portion which allows an operator to return a rejected sod roll to the sod field.

4. The apparatus according to claim 3 further comprising a ramp disposed below the retractable portion.

5. The apparatus according to claim 1 wherein the robotic arm comprises a horizontal pick-up head having a plurality of gripper modules, each gripper module configured to engage a separate individual sod roll.

6. The apparatus according to claim 5 wherein each gripper module comprises a pair of engageable fingers, the engageable fingers being configured to be rotatably positioned to engage a roll of sod positioned in the accumulator.

7. The apparatus according to claim 6 wherein the fingers are coupled to a gripper actuator, the gripper actuator having an extended position whereby the fingers are rotated into a position below a concave stripper.

8. The apparatus according to claim 6 wherein the fingers are coupled so as to cause the fingers to engage the separate sod rolls simultaneously.

9. The apparatus according to claim 6 wherein the horizontal pick-up head has a separator mechanism configured to cause movement of at least one gripper module with respect to another gripper module.

10. The apparatus according to claim 1 further comprising a controller configured to regulate the movement of a robotic arm.

11. The apparatus according to claim 10 wherein the robotic arm is hydraulically driven and the controller is configured to control at least one hydraulic valve.

12. The apparatus according to claim 5 wherein the controller is electronically coupled and configured to control the gripper modules.

13. The apparatus according to claim 5 wherein the controller is coupled to a plurality of actuators which are configured to keep the horizontal pick-up head horizontal.

14. The apparatus according to claim 10 further comprising a pair of forks configured to support a pallet in the sod storage location, said controller configured to control the movement of the forks from a first pallet location to a second pallet location.

15. A method of harvesting sod comprising the steps of:
    querying an operator for a predetermined sod stack configuration;
    setting a first counter to a first initial condition indicative of a number of rolls of layers of sod;
    setting a second counter to a second initial condition indicative of a number of rows of sod per layer;
    setting a third counter to a third initial condition indicative of a number of rolls of sod per row;
    if the first counter is less than an first initial condition, then performing the following:
        if the second counter is less than a second initial condition, the performing the following:
            if the third counter is less than an third initial condition, then performing the following:
                cutting a strip of sod,
                rolling the sod,
                conveying the sod roll to an accumulator belt,
                indexing the accumulator belt to receive another roll of sod,
                incrementing the third counter;
            instruct a robotic arm to pick up a plurality rolls of sod from the accumulator belt,
            instruct the robot arm to move the sod to a pallet,
            incrementing the second counter;
        incrementing the level of the pallet; and
    incrementing the first-counter.

16. The method according to claim 15 wherein the robotic arm is configured to simultaneously move the plurality of rolls of sod from an accumulator to a predetermined location on the pallet.

17. The method according to claim 15 further comprising a enabling a horizontal cutting mechanism to cut sod into strips.

18. The method according to claim 15 further comprising conveying the sod from the horizontal cutting mechanism to the accumulator.

19. The method according to claim 18 further comprising enabling a sod roller to roll sod strips.

20. The method according to claim 15 further including updating an operator display prior to incrementing the second counter.

21. The method according to claim 15 further including initiating a sequence to drop a full pallet on a field when the first counter is equal to the first condition.

* * * * *